United States Patent
Klappert et al.

(10) Patent No.: US 8,893,169 B2
(45) Date of Patent: Nov. 18, 2014

(54) SYSTEMS AND METHODS FOR SELECTIVELY OBSCURING PORTIONS OF MEDIA CONTENT USING A WIDGET

(75) Inventors: Walter R. Klappert, Los Angeles, CA (US); David D. Chung, Santa Clara, CA (US); Samson Bekele, Los Angeles, CA (US)

(73) Assignee: United Video Properties, Inc., Santa Clara, CA (US)

( * ) Notice: Subject to any disclaimer, the term of this patent is extended or adjusted under 35 U.S.C. 154(b) by 604 days.

(21) Appl. No.: 12/649,910

(22) Filed: Dec. 30, 2009

(65) Prior Publication Data

US 2011/0161999 A1  Jun. 30, 2011

(51) Int. Cl.
| | |
|---|---|
| H04N 7/16 | (2011.01) |
| H04N 21/454 | (2011.01) |
| H04N 21/4722 | (2011.01) |
| H04N 21/43 | (2011.01) |
| H04N 21/431 | (2011.01) |
| H04N 21/439 | (2011.01) |

(52) U.S. Cl.
CPC ....... *H04N 21/4307* (2013.01); *H04N 21/4542* (2013.01); *H04N 21/4722* (2013.01); *H04N 21/439* (2013.01); *H04N 21/4318* (2013.01)
USPC ................... 725/25; 725/28; 725/29; 725/32; 725/34; 725/47

(58) Field of Classification Search
USPC ............................ 725/25, 28–29, 32, 34, 47
See application file for complete search history.

(56) References Cited

U.S. PATENT DOCUMENTS

| | | | |
|---|---|---|---|
| 5,195,135 A | 3/1993 | Palmer | |
| 6,094,194 A * | 7/2000 | Jackson | 715/717 |
| 6,317,795 B1 | 11/2001 | Malkin et al. | |
| 7,360,160 B2 * | 4/2008 | Matz | 715/716 |
| 7,500,257 B2 * | 3/2009 | Berstis | 725/12 |
| 7,633,554 B2 | 12/2009 | Sloo et al. | |
| 2002/0056129 A1 | 5/2002 | Blackketter et al. | |
| 2003/0014480 A1 | 1/2003 | Pullara et al. | |
| 2004/0135316 A1 | 7/2004 | Lipscomb | |
| 2006/0031914 A1 | 2/2006 | Dakss et al. | |
| 2006/0271980 A1 | 11/2006 | Mankovitz | |
| 2007/0079322 A1 | 4/2007 | Sloo et al. | |
| 2007/0124752 A1 | 5/2007 | Sakai | |
| 2007/0157249 A1 | 7/2007 | Cordray et al. | |
| 2007/0250848 A1 | 10/2007 | Gorti et al. | |
| 2007/0297641 A1 * | 12/2007 | Criddle et al. | 382/100 |
| 2008/0022300 A1 | 1/2008 | Angiolillo et al. | |
| 2008/0032799 A1 | 2/2008 | Hamilton et al. | |
| 2008/0168515 A1 | 7/2008 | Benson et al. | |
| 2009/0007172 A1 | 1/2009 | Ahanger et al. | |
| 2009/0133073 A1 | 5/2009 | DaLaCruz et al. | |
| 2009/0217320 A1 | 8/2009 | Aldrey | |
| 2010/0060789 A1 | 3/2010 | Aoki et al. | |
| 2010/0083307 A1 | 4/2010 | Zalewski | |
| 2010/0205541 A1 | 8/2010 | Rapaport et al. | |
| 2011/0030005 A1 | 2/2011 | Austin | |
| 2011/0283309 A1 | 11/2011 | Bliss et al. | |

* cited by examiner

*Primary Examiner* — Pankaj Kumar
*Assistant Examiner* — Charles N Hicks
(74) *Attorney, Agent, or Firm* — Ropes & Gray LLP

(57) ABSTRACT

A widget running on user equipment selectively obscures portions of media content according to user and/or service provider defined criteria. Information regarding potentially objectionable content in media content may be stored in databases. Based on the information regarding potentially objectionable content and the defined criteria, the database may provide censor instructions. The instructions may be executed by the widget to obscure the potentially objectionable content in media content that is accessed by the user equipment.

60 Claims, 11 Drawing Sheets

600

| COMMUNICATIONS LOG |
|---|

<log_entry1> TV_WIDGET1 at address 167.67.23.166

<log_entry2> Begin communication with DATABASE1 at address 65.3.222.5

<log_entry3> TV_WIDGET1 transmitting user equipment information to DATABASE1:
 -TV_WIDGET1 located in Queens, NY
 -TV_WIDGET1 active on Spamsung TV
 -Spamsung TV connected to Set-Top Box Model 3000
 -Spamsung TV connected to Pony DVD Player
 -Spamsung TV connected to Spillips DVR <log_entry4> Receiving from DATABASE1 report of calculated delay:
 -Delay of TV_WIDGET1: 56 ms <log_entry5> TV_WIDGET1 transmitting currently accessed channel:
 - Broadcast media: Channel 25

<log_entry6> Receiving from DATABASE1 report of currently accessed media:
 -MOVIE: The 7$^{th}$ Compound <log_entry7> TV_WIDGET1 transmitting current widget configuration <log_entry8> Receiving from DATABASE1 instruction script for censor object:
 -Censor object label:   *object1*
 -Overlay censor object in:  5 seconds
 -Object type:    Triangle
 -Color type:    Opaque
 -Base size:    400 pixels
 -Height size:    570 pixels
 -Starting angle:   33°
 -Starting location:   (600, 600)
 -Object life:    10 seconds
 -Trajectory velocity:   20 pixels/second
 -Trajectory angle:   157°
 -Base size change:   6 pixels wider/second
 -Height size change:   4 pixels shorter/second <log_entry9> Receiving from DATABASE1 instruction script for censor object:
 -Display text:    FUN_FACT1
 -Location:    in *object1*
 -Text life:    5.2 seconds

FIG. 6

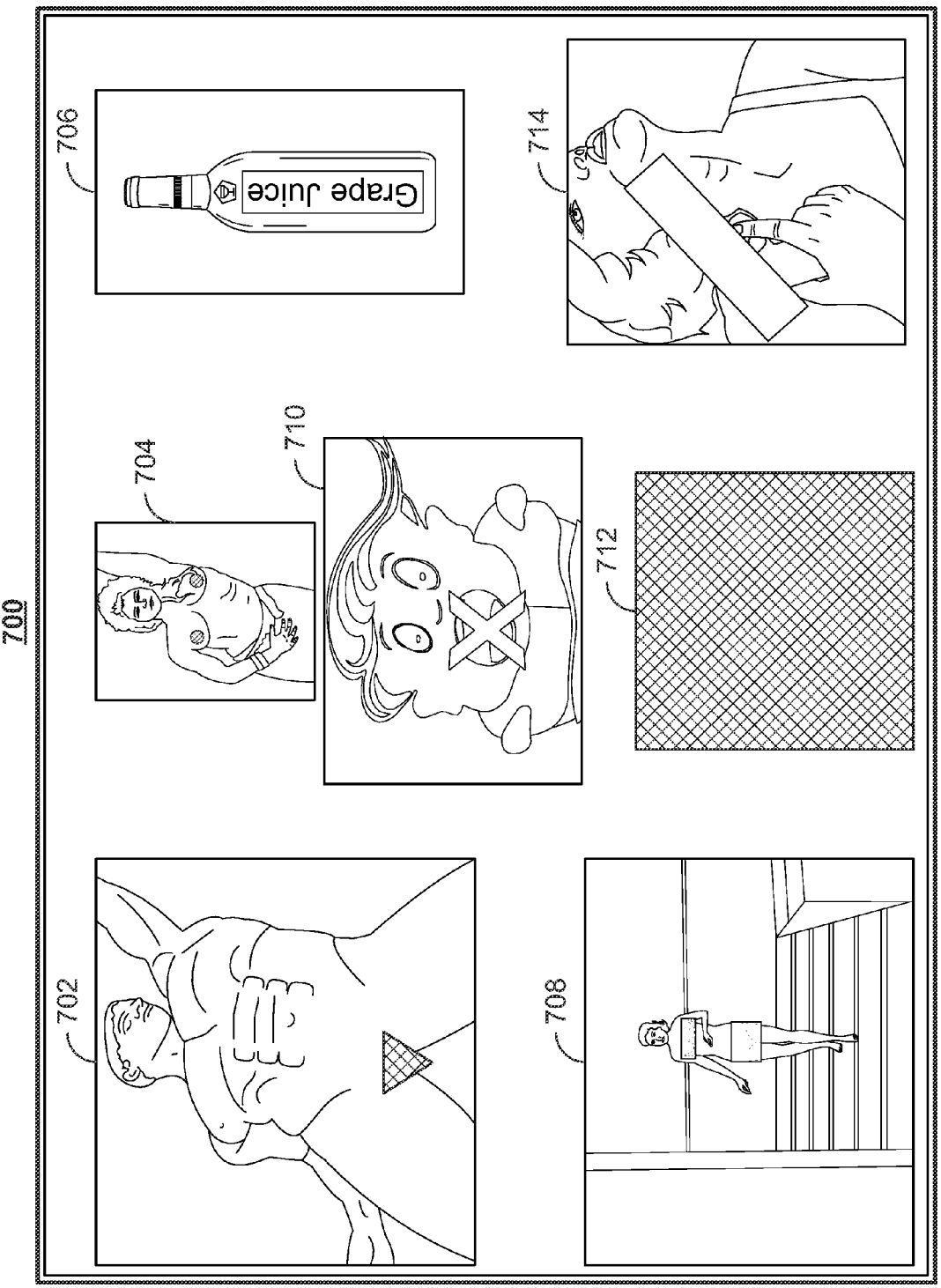

SYSTEMS AND METHODS FOR SELECTIVELY OBSCURING PORTIONS OF MEDIA CONTENT USING A WIDGET

BACKGROUND OF THE DISCLOSURE

Widgets are programs that provide information from the Internet and/or other communication means to a user through web and/or other services, and run on televisions and/or user equipment associated with televisions. Television widgets are widgets that run strictly on the hardware platform (e.g., control circuitry) of a television. Typically, television widgets have limited interactions with external user equipment, such as set top boxes. Further, television widgets have a limited amount of resources available to, for example, determine what content is being displayed on the television.

End-users, service providers, and/or other third parties generally have different preferences and views regarding profane, indecent, political, or violent content. However, current systems censor content at a service provider before the content reaches an end-user. This produces content that may be censored too much or too little, depending on an individual user's preferences.

Thus, a system which can provide customizable censoring operations that may be performed at the user's equipment can solve the inflexibility of current systems. However, performing censoring operations at a user's equipment creates many challenges in synchronizing censoring operations to content being displayed on the user equipment. Accordingly, there is a need for television widgets that overcome these limitations to provide these services. In particular, there is a need for a television widget that can overcome the challenges in synchronization and accurately obscure objectionable content being displayed on a user's equipment based on user-defined preferences.

SUMMARY OF THE DISCLOSURE

Methods and systems for using a widget to selectively obscure portions of media content are provided in accordance with various embodiments of the present disclosure.

In some embodiments, the amount of content that is obscured by the widget and the type of censors used to obscure the content may be configured by a user and/or service provider.

Information used by the widget to obscure content is generally stored at and provided by various databases. For example, the databases may store information pertaining to where and when potentially objectionable visual or audio content occurs within a particular movie, show, song, game, or any other media content.

When a user accesses media content, the widget may transmit the widget configuration information to an instruction generating device. In response, the instruction generating device may generate an instruction script for the widget to execute to obscure portions of the accessed media content based on information about the content stored in the databases. Additionally, the instruction script may be tailored to the preferences of a particular user based on the configuration options set by the user and/or service provider.

In some embodiments, the instruction script may instruct the widget to generate an object that may be displayed over objectionable visual content, wherein the characteristics of the object are based on the preferences of the user. In some embodiments, the instruction script may instruct the widget to generate a sound that may replace objectionable audio content, wherein the characteristics of the sound are based on the preferences of the user.

In some embodiments, timing instructions may be included in the instruction script such that the obscuring operations performed by the widget are synchronized with when the objectionable content is provided by the user's media equipment. In some embodiments, the timing instructions may account for various processing or transmission delays that may arise when providing media content on the user's equipment.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 6 shows an illustrative communications log between a widget and a database in accordance with an embodiment;

FIG. 7 shows an illustrative display of media content selectively obscured with obscuring objects created by a television widget in accordance with an embodiment;

DETAILED DESCRIPTION OF THE DISCLOSURE

To provide an overall understanding of the disclosure, certain illustrative embodiments will now be described, including systems and methods for overcoming synchronization challenges to accurately obscure portions of media content using a television widget. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Herein, the term obscure may refer to any suitable degree of content concealment or censorship and/or method of obscuring media content. The term obscure may refer to modifying visual content to obscure a portion and the entirety of the original visual content. For example, obscuring visual content may involve blurring the original visual content, completely blocking the original visual content, and/or replacing the original visual content with different visual content. The term obscure may also refer to modifying audio content to obscure a portion or the entirety of the original audio content. For example, obscuring audio content may involve scrambling the original audio content, silencing the original audio content, and/or replacing the original audio content with different audio content. These and further embodiments of obscuring media content are discussed in further detail below with regard to FIGS. 1-10.

In some embodiments, the obscuring is performed by the television widget by overlaying an obscuring object over visual media content. In some embodiments, the obscuring is performed by the television widget by overlaying an alternative waveform over audio media content. The obscuring objects and/or alternative waveforms may be generated by a third party, but a user, and/or by the television widget itself. These and further embodiments of the obscuring objects and alternative waveforms are discussed in further detail below with regard to FIGS. 1-10.

Figure 1:
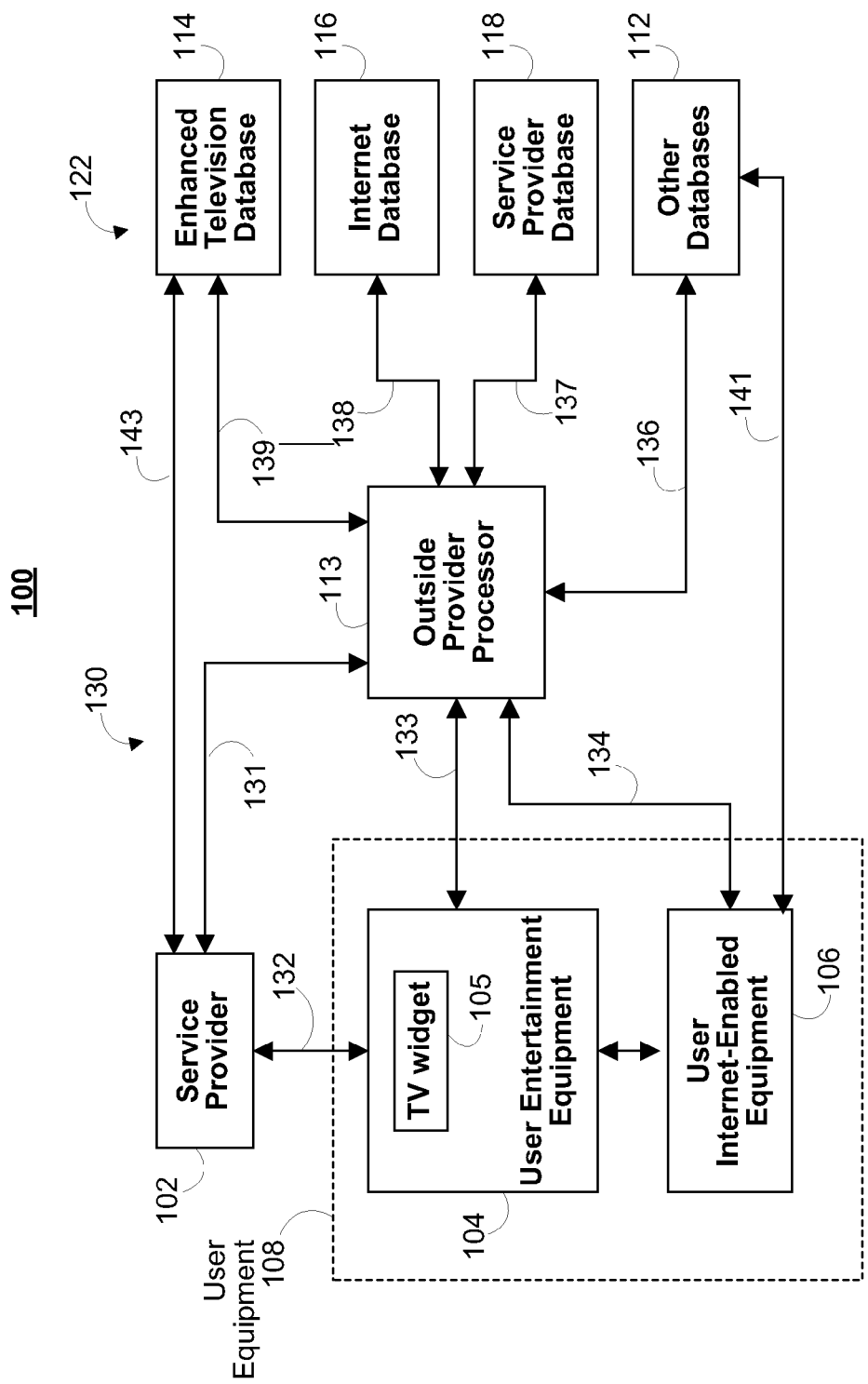
FIG. 1 shows an illustrative example of a system that selectively obscures portions of media content from a widget in accordance with an embodiment.

FIG. 1 illustrates an example of a system 100 for providing selectively obscuring portions of media content using a widget in accordance some embodiments. In some embodiments, television widget 105 may be resident in user entertainment equipment 104 within user equipment 108. User equipment 108 may include both user entertainment equipment 104 and user internet-enabled equipment 106.

Herein, media content may refer to any suitable type of media, including, but not limited to, conventional television programming (e.g., provided via traditional broadcast, cable, satellite, Internet, or other means), pay-per-view programs, on-demand programs (e.g., video-on-demand (VOD) programs), Internet content (e.g., streaming media, downloadable media, Webcasts, etc.), video clips, articles, advertisements, chat sessions, games, still images, animation, text, interactive media, and other types of audio, visual and/or media content. Media content may be recorded, played, displayed, provided, and/or accessed by information content processing devices, such as computerized and electronic devices and/or user equipment 108, In some embodiments, media content may also be part of a live performance.

Television widget 105 is an application that is downloaded or installed in user entertainment equipment 104, and may be run by an interpreter or virtual machine (run by the control circuitry of user entertainment equipment 104—see control circuitry 204 in FIG. 2, below). Television widget 105 allows users to interact with web services while watching television on user entertainment equipment 104. In some embodiments, television widget 105 may run on the Yahoo! Connected TV platform, and user entertainment equipment 104 may be a television manufactured with built-support for television widget 105 from one of Samsung Group, Sony Group, LG Electronics, or Vizio.

Figure 2:
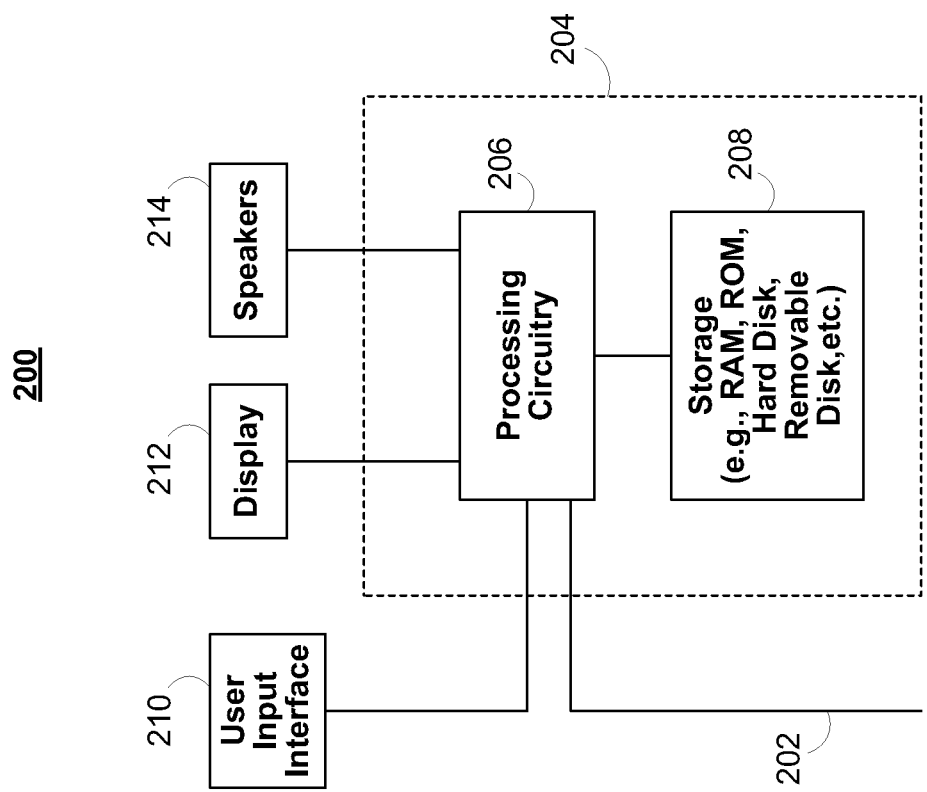
FIG. 2 shows an illustrative example of user equipment devices that may be used to implement the television widget in accordance with an embodiment.

In other embodiments, the television widget may be downloaded and interpreted or otherwise run by an interpreter or virtual machine (run by control circuitry 204 of FIG. 2). In some embodiments, the guidance application may be encoded in the enhanced television (ETV) Binary Interchange Format (EBIF), received by control circuitry 204 as part of a suitable feed, and interpreted by a user agent running on control circuitry 204. For example, television widget 105 may be an EBIF widget and user entertainment equipment 104 may be a set-top box. In other embodiments, the television widget may be defined by a series of JAVA-based or any other suitable platform-based files that are received and run by a local virtual machine or other suitable middleware executed by control circuitry 204. In some of such embodiments (e.g., those employing MPEG-2 or other digital media encoding schemes, the guidance application may be, for example, encoded and transmitted in an MPEG-2 object carousel with the MPEG audio and video packets of a program. In the example, television widget 105 may be an OpenCable™ application platform (OCAP) widget (e.g., a tru2way widget), and user entertainment equipment 104 may be a set-top box.

In other embodiments, user entertainment equipment 104 may include a user television equipment, user computer equipment, a wireless user communication device, a set-top box, or any other type of user entertainment equipment for accessing media, such as a non-portable gaming machine.

In some embodiments, the user may enter settings information, such as user profile information and user permissions information, into user internet-enabled equipment 106. Assuming that the user sets their permissions such that user profile information may be stored externally, the user profile information may be stored in databases 122. User internet-enabled equipment 106 may include a set-top box, an integrated receiver decoder (IRD) for handling satellite television, a PC, a laptop, a tablet, a WebTV box, a personal computer television (PC/TV), a PC media server, a PC media center, a television set, a digital storage device, a DVD recorder, a video-cassette recorder (VCR), a local media server, wireless user communications devices, or any other suitable internet-enabled equipment. WEBTV is a trademark owned by Microsoft Corp. Wireless communications devices may include PDAs, a mobile telephone, a smartphone, a portable music player, a portable gaming machine, or other wireless devices.

In system 100 there is typically more than one of each type of user equipment device, but only one of each is shown in FIG. 1 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

It should be noted that, with the advent of television tuner cards for PC's, WebTV, and the integration of video into other user equipment devices, the lines have become blurred when trying to classify a device as a user entertainment device or a user internet-enabled device. In fact, in some embodiments television widget 105 may run on user internet-enabled equipment 106 in addition to user entertainment equipment 104, and settings information may be entered using either type of user equipment. Each of user equipment 108 may utilize at least some of the system features described below with respect to FIG. 2 and, as a result, include flexibility with respect to the type of interactive applications available on the device. For example, user entertainment equipment 104 may be internet-enabled allowing for access to settings information through the Internet, while user internet-enabled equipment may include a tuner allowing for access to television programming, and both may run television widget 105. The television widget may have the same layout on the various types of user equipment or may be tailored to the display capabilities of the user equipment. For example, on user entertainment equipment 104, television widget 105 may run as a persistent (e.g., always-running) application as described above. In another example, television widget may be scaled down for wireless user communications devices.

The settings information entered by the user may be consistent across in-home devices and remote devices. Settings include those user profile and user permission settings described herein, as well as channel and program favorites, programming preferences, display preferences, and other desirable guidance settings. For example, if a user sets a channel as a favorite on the web site www.tvguide.com on their personal computer at their office, the same channel would appear as a favorite on the user's in-home devices (e.g., user entertainment equipment 104 and user internet-enabled equipment 106). Therefore, changes in user profile or user permissions settings made on one user equipment device can change the user's experience on another user equipment device, regardless of whether they are the same or a different type of user equipment device. In addition, the changes made may be based on settings input by a user, as well as user activity monitored by television widget 105.

The user equipment devices of user equipment 108 may be coupled to communications network 130. Namely, user entertainment equipment 104 and user internet-enabled equipment 106 may be coupled to communications network 130 using communications paths 133 and 134, respectively. Communications network 130 may be one or more networks including the Internet, a mobile phone network, mobile device (e.g., Blackberry) network, cable network, public switched telephone network, or other types of communications networks. BLACKBERRY is a service mark owned by Research In Motion Limited, Corp. Paths 131-143 may separately or together include one or more communications paths, such as a satellite path, a fiber-optic path, a cable path, a path that supports Internet communications (e.g., Internet Protocol television), free-space connections (e.g., for broadcast or other wireless signals), or any other suitable wired or wireless communications path or combination of such paths. Communications with the user equipment devices may be provided by one or more of these communications paths, but are shown as a single path in FIG. 1 to avoid overcomplicating the drawing.

Although communications paths are not drawn between user equipment devices, these devices may communicate directly with each other via communication paths, such as those described above in connection with paths 131-143, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 130.

Television widget 105 may send information to service provider 102 over communications link 132 and/or outside provider processor 113 (hereinafter "OPP 113") over communications link 133. In some embodiments, communications with service provider 102 and OPP 113 may be exchanged over one or more communications paths, but are shown as two separate paths in FIG. 1 to avoid overcomplicating the drawing. In addition, there may be more than one of each of service provider 102 and OPP 113, but only one of each is shown in FIG. 1 to avoid overcomplicating the drawing. As will be described, the information television widget 105 sends to these sources may be as little as an identification number and/or the channel the user is watching.

Service provider 102 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Service provider 102 may be the originator of media content (e.g., a television broadcaster, a Webcast provider, a digital cable service provider, a bundled communication (e.g., Internet, telephone, and TV) provider such as Verizon fiber optic service (FiOS), a provider of digital on-demand media affiliated with a movie studio or television network, a cellular telephone service provider, etc.) or may not be the originator of media content (e.g., an on-demand media content provider, an Internet provider of video content of broadcast programs for downloading, etc.). Service provider 102 may include cable sources, satellite providers, on-demand providers, Internet providers, or other providers of media content. Service provider 102 may also include a remote media server used to store different types of media content (including video content selected by a user, such as, for example, on the website www.hulu.com), in a location remote from any of the user equipment devices. As used herein, the term broadcaster may refer to an analog or digital signal provider, a cable network, a satellite provider, an Internet website, an Internet content provider, or any such provider that may distribute content such as programs or program segments to user equipment or user equipment devices. As used herein, the terms broadcaster's website or program broadcaster's website may refer to one or many web addresses, server addresses, databases, or other sources of program information or program content, specific to a particular broadcaster, and associated with Internet websites or other content providers. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Service provider 102 may also provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips or segments, etc.), on-demand information, and any other type of guidance data that is helpful for a user to navigate among and locate desired media selections.

OPP 113 may include a data processor (e.g., any suitable computer server equipment) operated by an outside provider (e.g., the provider of television widget 105) that can act as a central hub for communications between television widget 105 running on user equipment 108, service provider 102, and databases 122. As will be discussed, databases 122 may include enhanced television database 114, internet database 116, service provider database 118, and other databases 112. In some embodiments, OPP 113 may store and retrieve information from databases 122. Databases 122 may be any suitable computer database equipment, and may include any suitable computer server equipment and/or computer storage devices.

In some embodiments, OPP 113 may identify the channel a user is tuned to and/or the identity of media content being accessed by the user of television widget 105. To achieve this function, OPP 113 may exchange information with service provider 102 via communication link 131, user equipment 108 via communication links 133 and/or 134, and databases 122 via communication links 136, 137, 138, and/or 139. In some embodiments, OPP 113 may identify portions of the media content the user is accessing that the user may find objectionable. In some embodiments, this identification may be performed based on information stored in the user's profile information set on user equipment 108 and media content information stored in databases 122, as well as scheduling information obtained from service provider 102. In some embodiments, this identification may be made by service provider 102 itself.

In some embodiments, OPP 113 may act as a clearinghouse of information for providing data and/or other interactive features to the user of television widget 105. To achieve this function, OPP may exchange information with databases 122 via communication links 136-139. For example, OPP 113 can continuously receive information regarding portions of media content from internet database 116 via communication link 138, and user profile information from other databases 112 via communication link 136. For example, OPP 113 may then provide data and/or other interactive features related to obscuring portions of currently accessed media content using television widget 105, user profile information stored in other databases 112, and censor information stored in databases 122. More specifically, OPP 113 could determine whether television widget 105 should modify a portion of the media content being accessed by a user to prevent the user from hearing or seeing content the user may find objectionable.

Databases 122 may include any suitable computer database and/or server equipment. In some embodiments, databases 122 may be operated by a proprietor of any suitable media content, either physical or digital. In some embodiments, databases 122 store information pertaining to the content of media. For example, the information may pertain to instances within the media when images and/or audio related to nudity, sexual content, profanity, drug use, and/or violence. For example, databases 122 may maintain information that media_content1 portrays excessive gun violence at time 35 minute through minute 47. In some embodiments, databases 122 may maintain information pertaining to where, for example, within a frame of the media content the potentially offensive instances occur. For example, databases 122 may maintain information that media_content1 portrays excessive gun violence between pixels 670 to 890 on the x-axis and pixels 750 to 980 on the y-axis. Further embodiments of the type of information that may be stored and/or maintained in databases 122 are described in further detail below with regards to FIGS. 2-10.

The information stored in databases 122 may be in any suitable format; for example, in a format that may be utilized by widget 105. The enhanced television database 114 may be a single database or collection of databases that store the information in any suitable enhanced TV format, such as EBIF. As another example, internet database 116 may be a single database or a collection of databases accessible by the Internet. For example, a first database of internet database 116 may maintain text based information pertaining to when and where within media content nudity occurs. A second database of internet database 116 may maintain enhanced TV format based information pertaining to when and where within media content violence occurs.

In some embodiments, service provider database 118 may be a single database or collection of databases maintained by any suitable service provider. For example, a media content provider may maintain information pertaining to potentially objectionable content in the media content it provides. For example, HBO may maintain information pertaining to when and where nudity occurs within the movies HBO provides to users.

Other databases 112 may be any other suitable database capable of storing information for widget 105 in any suitable format. For example, other databases 112 may be maintained by movie studios, promotional organizations, government organizations, and/or special organizations, and/or any other suitable organization with an interest in providing suitable information for widget 105. In some embodiments, other databases 112 store information regarding actors, directors, producers, trivia, promotional information, and/or other suitable information related to media content.

It should be noted that the illustration of databases 122 as including separate and distinct databases is done for illustrative purposes and is not meant to be limiting. Databases 122 may store any suitable information, in any suitable format. In some embodiments, characteristics of any of databases 122 may be shared, combined, and/or omitted from any of databases 122. For example, enhanced television database 114 may be an internet-based database such as internet database 116 and/or maintained by a service provider such as service provider database 118.

In some embodiments, OPP 113 reformats and/or combines information provided by databases 122 into a format that may be utilized by widget 105 and/or service provider 102. For example, enhanced television database 114 may provide EBIF information pertaining to nudity in a movie and internet database 116 provides text-based information pertaining to violence in the movie. OPP 113 may reformat the information from internet database 116 into EBIF and combine with the information provided by enhanced television database 114. OPP 113 may reformat and combine information provided by databases 122 in any suitable manner. In some embodiments, information provided by databases 122 is reformatted and/or combined by user equipment 108, for example, by widget 105. In such embodiments, information may be directly provided by databases 122 to user equipment 108 using communications link 141. To avoid overcomplicating the drawing, communications link 141 is illustrated as being coupled to user internet-enabled equipment 106 and other databases 112, but it should be noted that communications link 141 may be coupled to any of databases 122 and any suitable portion of user equipment 108 in any suitable manner.

In some embodiments, information provided by databases 122 is reformatted and/or combined by service provider 102. In such embodiments, information may be directly provided by databases 122 to service provider 102 using communications 143. To avoid overcomplicating the drawing, communications link 143 is illustrated as being coupled to service provider 102 and enhanced television database 114, but it should be noted that communications link 143 may be coupled to any of databases 122 in any suitable manner.

FIG. 2 illustrates an example of generalized user equipment device 200 that may be used to implement television widget 105 of FIG. 1 in accordance with some embodiments. User equipment device 200 may receive and send information from service provider 102 and/or OPP 113 of FIG. 1 via input/output (hereinafter "I/O") path 202. I/O path 202 may provide data to control circuitry 204, which may include processing circuitry 206 and storage 208. I/O path 202 may connect control circuitry 204 (and specifically processing circuitry 206) to one or more communication paths (described below). I/O functions may be provided by one or more of these communication paths, but are shown as a single path in FIG. 2 to avoid overcomplicating the drawing.

Control circuitry 204 may be based on any suitable processing circuitry 206 such as processing circuitry based on one or more microprocessors, microcontrollers, digital signal processors, programmable logic devices, etc. In some embodiments, control circuitry 204 executes instructions for television widget 105 or any other applications stored in memory (e.g., storage 208). In client-server based embodiments, control circuitry 204 may include communications circuitry suitable for communicating with networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 1). In addition, communications circuitry may include circuitry that enables peer-to-peer communication of user equipment devices, or communication of user equipment devices in locations remote from each other (described in more detail in connection with FIG. 1).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 208 that is part of control circuitry 204. Storage 208 may include one or more of the above types of storage devices. For example, user equipment device 200 may include a hard drive for a digital video recorder (DVR) (sometimes called a personal video recorder, or PVR) and a DVD recorder as a secondary storage device. Storage 208 may be used to store various types of media and data described herein, including program information, widget settings, user preferences or profile information, or other data used in operating television widget 105. Nonvolatile memory may also be used (e.g., to launch a boot-up routine and other instructions).

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting media into the preferred output format of the user equipment device 200. Circuitry 204 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive data for television widget 105. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc). If storage 208 is provided as a separate device from user equipment device 200, the tuning and encoding circuitry (including multiple tuners) may be associated with storage 208.

A user may control the control circuitry 204 using user input interface 210. User input interface 210 may be any suitable user interface, such as a remote control, mouse, trackball, keypad, keyboard, touch screen, touch pad, stylus input, joystick, voice recognition interface, or other user input interfaces. Display 212 may be provided as a stand-alone device or integrated with other elements of user equipment device 200. Display 212 may be one or more of a monitor, a television, a liquid crystal display (LCD) for a mobile device, or any other suitable equipment for displaying visual images. In some embodiments, display 212 may be HDTV-capable. Speakers 214 may be provided as integrated with other elements of user equipment device 200 or may be stand-alone units. The audio component of videos and other media content displayed on display 212 may be played through speakers 214. In some embodiments, the audio may be distributed to a receiver (not shown), which processes and outputs the audio via speakers 214.

Figure 3:
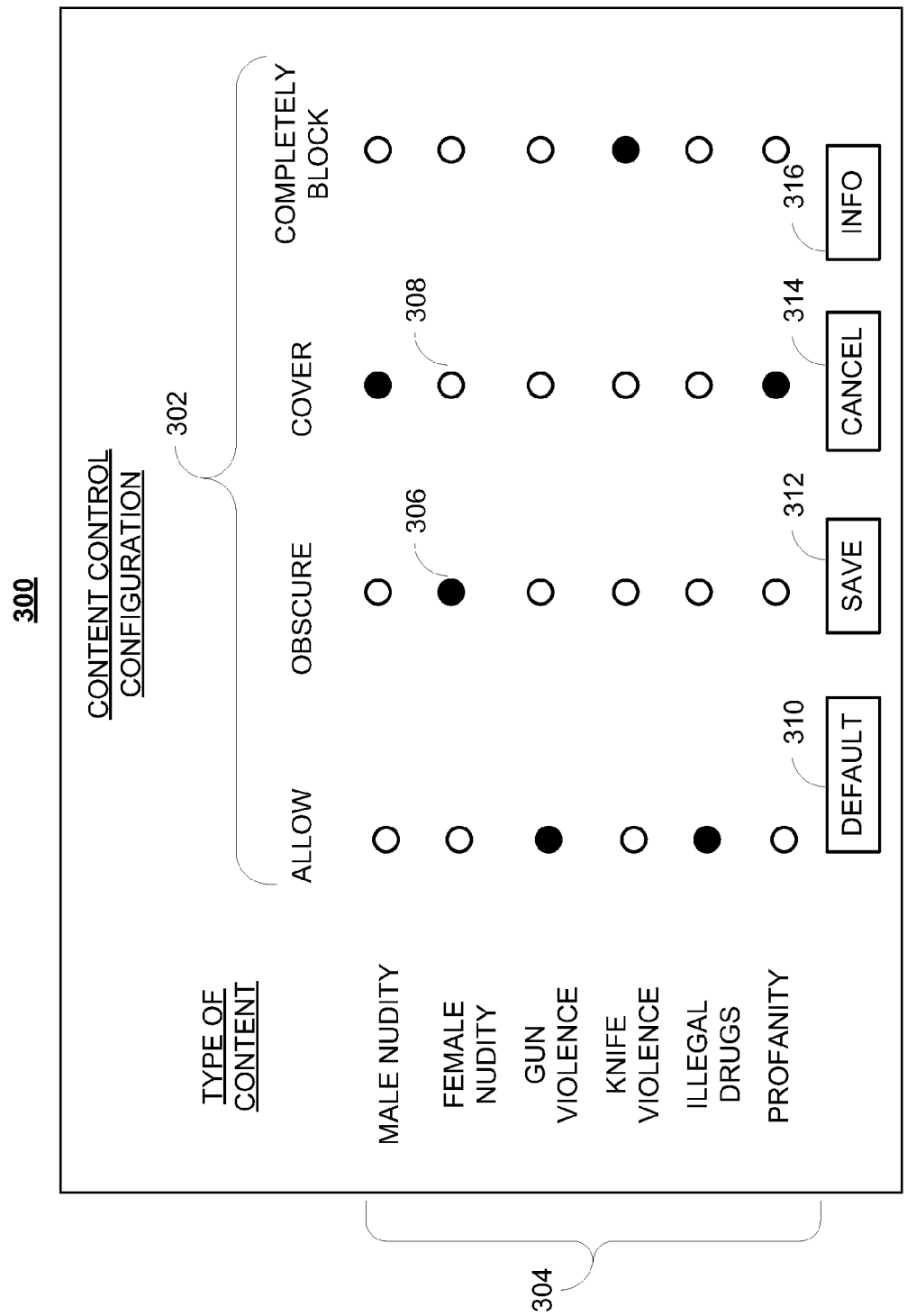
FIG. 3 shows an illustrative display of a content control configuration menu in accordance with an embodiment.

FIG. 3 illustrates an example of content control configuration menu 300 used to configure what type of content a television widget, such as widget 105 of FIG. 1, will access and selectively obscure and to what extent the content will be obscured. Content control configuration menu 300 includes obscuring options 302, type of content options 304, selected option 306, unselected option 308, default button 310, save button 312, cancel button 314, and information button 316.

In some embodiments, obscuring options 302 allow a user and/or a service provider to configure a television widget that selectively obscures media content. For example, obscuring options 302 allow a user and/or service provider to select between allowing, obscuring, covering, and/or completely blocking a particular type of content using the television widget. For example, the widget can overlay an object on visual content and/or replace objectionable audio content with audio that is less objectionable or not objectionable at all. The manner in which the objectionable visual content and/or audio content is modified may be configured using obscuring options 302.

For example, a user may find one of type of content options 304 more objectionable than another type of content option. For example, a user may find knife violence more objectionable than female nudity. As such, the user may select female nudity to be obscured, while knife violence may be completely blocked. If a user does not find gun violence objectionable, the user may allow such content to be provided without modification. Type of content options 304 may include any suitable type of content. For example, type of content options 304 may include types of nudity (e.g., full, brief, male, female), types of visual and/or audible sexual content, types visual and/or audible violence, types of visual and/or audible illicit drug use, types of visual and/or audible social and/or anti-social behavior, and/or different types of visual and/or audible profanity, and/or any other suitable type of text, speech, audio, visual content that a user and/or service provider may want to obscure.

Selections for content control configuration may be made by a user and/or service operator by, for example, selecting option 306 and/or not selecting option 308. Obscuring options 302 may have any suitable number of options. For example, options 302 may not include an allow option. Alternatively, or additionally, options 302 may include other options, for example, options 302 may include options to blur, dim, shade, veil, and/or any other suitable option to obscure objectionable content.

In some embodiments, default button 310 may be included in content control configuration menu 300. Default button 310 may allow a user and/or service provider to easily select default content control configuration setting. In some embodiments, save button 312 may be included in menu 300. Save button 312 may allow a user and/or service provider to save their configuration options. In some embodiments, cancel button 314 may be included in menu 300. Cancel button 314 may allow a user and/or service provider to cancel any changes they made to the configuration options. In some embodiments, information button 316 may be included in menu 300. A user and/or service provider may select information button 316 if they require additional information regarding any of the options in menu 300.

Figure 4:
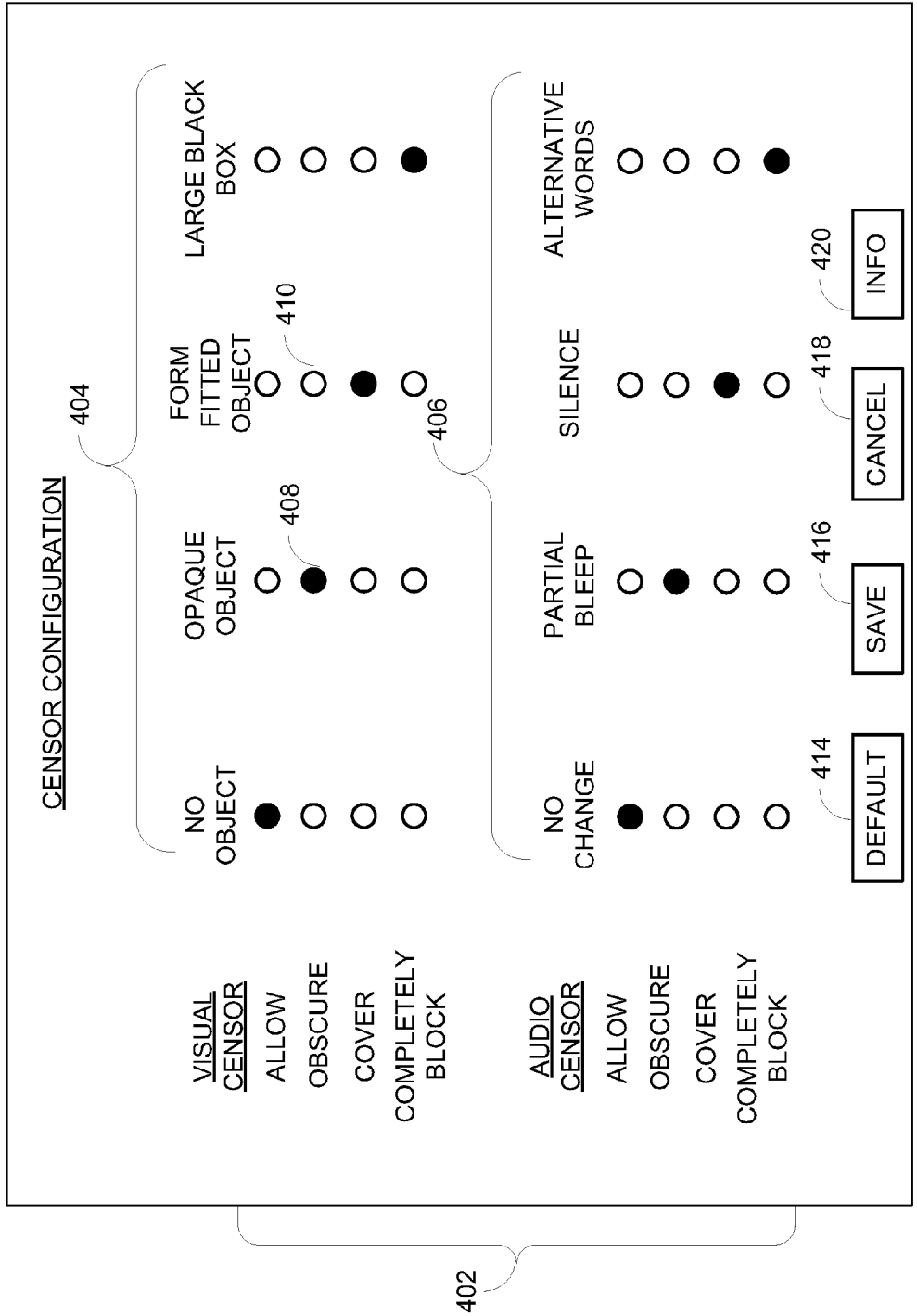
FIG. 4 shows an illustrative display of a censor configuration menu in accordance with an embodiment.

FIG. 4 illustrates an example of censor configuration menu 400 used to configure the type of action a television widget, such as widget 105 of FIG. 1, may take for different obscuring options in accordance with some embodiments. For example, the television widget may take different actions for at least one of obscuring options 302 selected in content control configuration menu 300 of FIG. 3. Censor configuration menu 400 includes obscuring options 402, visual action options 404, audio action options 406, selected option 408, unselected option 410, default button 414, save button 416, cancel button 418, and information button 420.

In some embodiments, a user and/or service provider may be allowed to configure the actions a television widget takes for different obscuring options 402. Obscuring options 402 may be substantially similar to obscuring options 302 of FIG. 3. For example, the actions assigned to obscuring options 402 may apply to the type of content options 304 selected in content control configuration menu 300 of FIG. 3. For example, one or more of visual action options 404 and/or audio action options 406 may be invoked when a type of content selected at type of content options 304 is encountered. For example, the widget may overlay a translucent or opaque object over types of content that have been configured to be obscured in menu 300. As another example, the widget may overlay a form-fitted object over types of content that have been configured to be covered in menu 300. As another example, the widget may overlay a large black box over types of content that have been configured to be completely blocked in menu 300. As another example, the widget may not overlay any object over types of content that have been configured to be allowed in menu 300.

In some embodiments, visual action options 404 may include any suitable number of options regarding the type of obscuring objects that may be utilized to obscure visual content. For example, visual action options 404 may include options regarding the color, duration, geometric shape, orientation, opacity, placement over and/or around the associated type of content, and/or any other suitable property for a censor object that may be used to obscure the associated type of content. For example, the censor object may be overlaid above portions of media content that the user and/or service provider may find objectionable. In some embodiments, the censor object used to obscure content may include text, picture, graphics and/or video, and/or any other suitable type of content. For example, if an original media content stream includes illicit drug use that a user finds objectionable, the television widget may overlay an object onto of the portions of the media content that include the illicit drug use to obscure the illicit drug use from viewers of the media content. Additionally, or alternatively, the object may include text, such as "Just Say NO!" Such text included in a censor object may provide a message to the viewers regarding the obscured content. In some embodiments, text, pictures, graphics, and/or videos may be included in the censor object to advertise and/or enhance the viewing experience of the media content's viewers. Further applications of the censor object are discussed in further detail below with regard to FIGS. 5-10.

In some embodiments, audio action options 406 may include any suitable number of options. For example, audio action options 406 may include any suitable options regarding replacement audio that may replace and/or be overlaid over the audio of media content that a user and/or service provider may find objectionable. Audio action options 406 may also include options regarding the tone, volume, pitch, duration, and/or any other suitable property for the replacement audio. In some embodiments, the replacement audio may include alternate sounds, such as, alternative speech. For example, audio content selected to be obscured using obscuring options 302 of FIG. 3, may be replaced or overlaid with a bleep of any suitable duration. As another example, audio content selected to be covered using obscuring options 302 may be modified such that the audio content is silent. The volume of audio content with objectionable material may be reduced to 0 during the duration, or during a portion of the duration, of the objectionable material.

In some embodiments, the replacement audio may be stored in any suitable location, such as databases 122 of FIG. 1. The replacement audio may be sent to the television widget with instructions to obscure audio content using the replacement audio. Alternatively, the replacement audio may be stored locally in storage 208 of FIG. 2, and accessed by the television as needed to obscure audio content. In some embodiments, the television widget may create the replacement audio. For example, the television widget instructs processing circuitry 206 to generate data for a sound with a particular waveform (e.g., a tone with a particular pitch) and send the data to speakers 214 at an appropriate time.

In some embodiments, audio content selected to be completely blocked may be replaced with alternative words. For example, a profane word in accessed media content may be replaced with an inoffensive word. In some embodiments, the audio censoring may be coordinated with the visual censoring such that an audio censor is accompanied with a visual censor. For example, the widget may obscure the mouth of an actor uttering a profane word as well as obscure the profane word itself.

In some embodiments, a user and/or service operator may configure the television widget to uncensor selected media content using censor configuration menu 400. Herein, uncensor may refer to removing a censor placed in media content and/or replacing censored media content with original and/or alternative uncensored media content. For example, obscuring options 302 of FIG. 3 and/or obscuring options 402 may include an option to reverse censored content and/or make media content more profane. For example, a television broadcast provider may broadcast a censored version of a movie where the profane language in the original movie has been replaced with alternative words. The television widget may be configured to replace the censored words with the words from the original movie. For example, a censor may have used a bleep to censor a particular profane word. The television widget may replace the bleep with the original particular profane word and/or another profane word. Such reverse censorship using a television may also apply to visual censors. For example, the television broadcast provider may broadcast the movie where nudity has been obscured. The television widget may replace the obscured nudity with the original nude content and/or with alternative nude content. In some embodiments, the television widget may restore and/or modify any suitable portion of media content.

The options of censor configuration menu 400 may be selected using, for example, selected option 408 and/or unselected option 410. Selected option 408 and unselected option 410 may be substantially similar to selected option 306 and unselected option 308 of FIG. 3, respectively.

In some embodiments, default button 414, save button 416, cancel button 418, and/or information button 420 may be included in censor configuration menu 400. Default button 414, save button 416, cancel button 418, and information button 420 may be substantially similar to default button 310, save button 312, cancel button 314, and information button 316 of FIG. 3, respectively.

Figure 5:
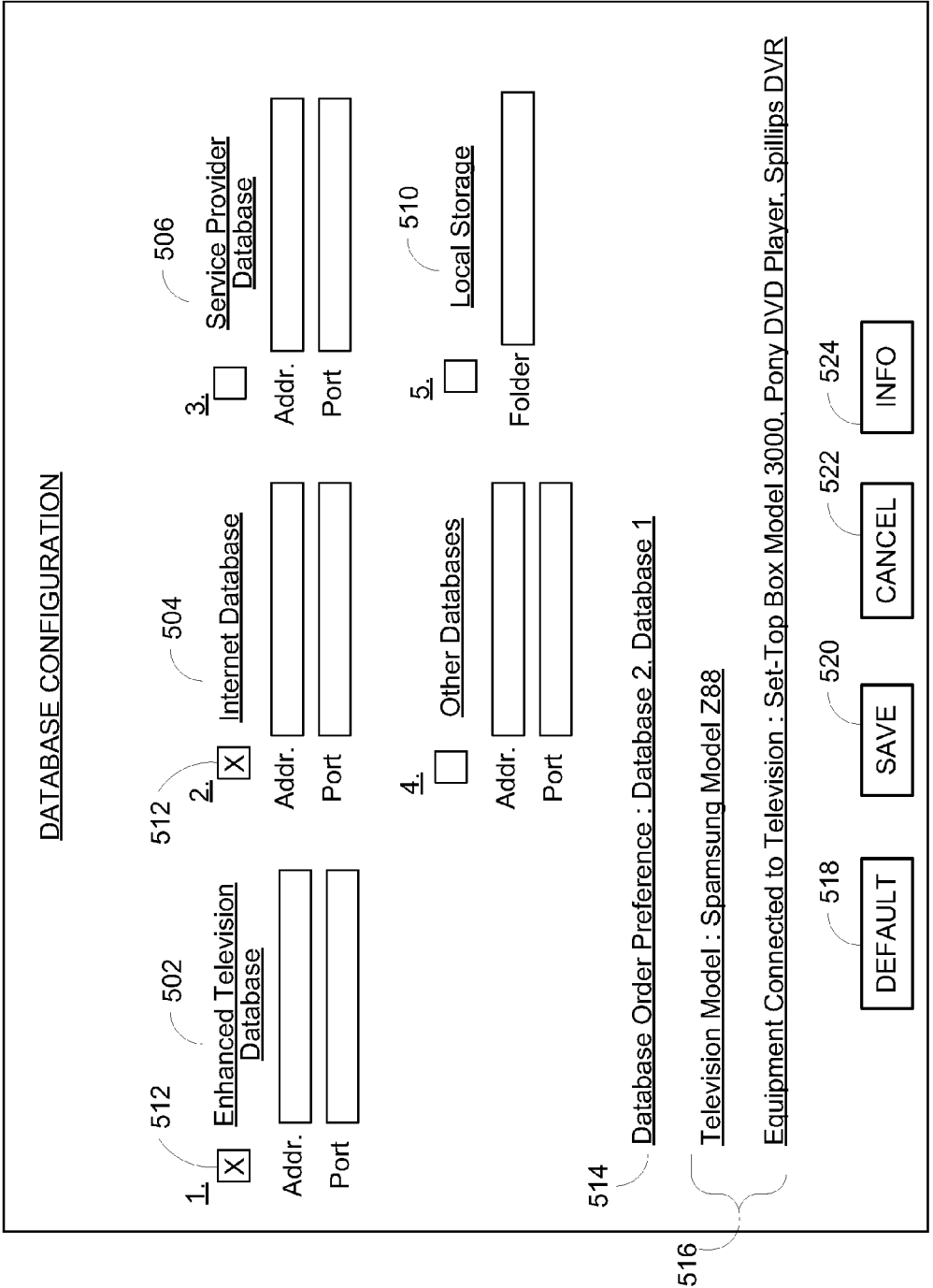
FIG. 5 shows an illustrative display of a database configuration menu in accordance with an embodiment.

FIG. 5 illustrates an example of a database configuration menu 500 used to configure with which databases a television widget, such as widget 105 of FIG. 1, may communicate. Database configuration menu 500 includes enhanced television database configuration 502, internet database configuration 504, service provider database configuration 506, other databases configuration 508, local storage configuration 510, checkboxes 512, database order preference configuration 514, user equipment information 516, default button 518, save button 520, cancel button 522, and information button 524.

In some embodiments, enhanced television database configuration 502, internet database configuration 504, service provider database configuration 506, other databases configuration 508 may be used by a user and/or service provider to configure communication information for the television widget. For example, configurations 502-508 may include information pertaining to the databases' network addresses, communication port information, relevant data storage locations within the databases, data format information, routing information, type of data stored at the associated databases, type of data to be retrieved and/or received from the databases, and/or any other suitable information that may be used by the television widget to selectively obscure media content. The databases associated with enhanced television database configuration 502, internet database configuration 504, service provider database configuration 506, and other databases configuration 508 may be substantially similar to databases 122, for example, enhanced television database 114, internet database 116, service provider database 118, and other databases 112 of FIG. 1, respectively.

As discussed above, databases 122 may store any suitable information. For example, databases 122 may store information pertaining to the composition of media content that may be used by a television widget to selectively obscure media content according to configuration setting set in content control configuration menu 300 of FIG. 3 and/or censor configuration menu 400 of FIG. 4. As another example, databases 122 may store the times and locations within media content where particular types of content occurs types of content discussed in relation to type of content options 304 of FIG. 3.

In some embodiments, a first database of databases 122 may store information for a particular media content that includes location information for where within the particular media content nudity, violence, and/or any other suitable type of content occurs. For example, the first database may store information that indicates, for example, that nudity occurs around pixel location (380,420). In some embodiments, the information may include ranges of pixels where the nudity occurs. For example, the information may indicate that, for the 380th x-axis pixel, there is nudity between y-axis pixels 320 to 520. In some embodiments, databases 122 may store the location information in terms of general frame location in addition to or alternative to storing the location information in terms of pixels. For example, databases 122 may store information that indicates that violence occurs in a particular region of media content, such as in the upper right quadrant. In some embodiments, the locations of types of content may be stored in polar coordinates as opposed to, or in addition to, rectangular coordinates. In some embodiments, the location information may be stored for all or some frames where a particular type of content occurs. In some embodiments, the location information may be associated with a time or range of times within media content where the particular type of content occurs. Databases 122 may store the location information in any other suitable format.

In some embodiments, the location information may be associated with size change information. For example, gun violence may occur at a first time in a movie with a width of 25 pixels. The same gun violence may later expand to a width of 250 pixels at a second time. In such an embodiment, the location information may store information pertaining to the change in width of the gun violence in terms of, for example, pixels per second.

In some embodiments, the location information may be additionally, or alternatively, associated with trajectory information. For example, a particular media content may include a nude woman walking across a screen over a period of time. The trajectory information may include starting and/or ending point(s) for the nude content. The trajectory information may also include information pertaining to the speed at which the nude content moves across the screen, for example, a trajectory velocity in terms of pixels per second. In some embodiments, the content may not remain within a single horizontal and/or vertical plane. In such embodiments, the trajectory information may include a trajectory angle; for example, the nude content moves from a starting point at a 33 degree angle. In some embodiments, the trajectory information may be associated with a duration. For example, the trajectory information may be valid for 13 seconds after the nude woman first appears on the screen. In some embodiments, the trajectory information may be associated with any suitable mathematical formula defining a particular type of content's movement through a media content.

In some embodiments, each pixel that is associated with a particular type of content may be associated with a varying degree of association. For example, a pixel at (380, 425) may have a high degree of association with nudity, while a pixel at (370, 425) may have medium degree of association with nudity, and a pixel at (360, 425) may have low degree of association with nudity. This information may be utilized by the television widget to selectively obscure the nudity content. For example, if a user has configured the television widget to completely block nudity, a censor object that the television widget overlays on media content may be overlaid on all pixels that have any association with nudity. Alternatively, if the user configured the television widget to obscure nudity, the censor object that the television widget overlays on the media content may be overlaid only on the pixels that have a high degree of association with nudity, and not on the pixels with medium to low degrees of association with nudity. The association with the varying degrees of a particular type of content may be implemented in any other suitable manner.

In some embodiments, databases 122 may store the timing of when particular types of content occur within media content. For example, databases 122 may store information that indicates that a profane word is spoken starting at frame x. Alternatively, or additionally, databases 122 may store information that indicates that a profane word begins, for example, 22 minutes, 10.356 seconds after the beginning of the media content or any other suitable point within the media content. Databases 122 may store the timing information in any other suitable format.

In some embodiments, the timing information may be associated with varying degrees of association to a particular type of content. For example, a profane word may first be uttered at a first time, time1, in a particular media content. However, the profane word may not be fully recognizable until a second time, time2. For example, the first letter of a profane word may be uttered at time1, the second letter at time2, and the end of the profane word at a third time, time3.

The profane word is not recognizable until the second letter is heard. As such, the audio of the media content between time1 and time2 may have a low degree of association to profanity, while the audio of the media content between time2 and time3 may have a high degree of association to profanity. This information may be utilized by the television widget to selectively obscure the profane content. For example, if a user has configured the television widget to completely block profanity, all the audio from time1 through time3 may be replaced with more suitable alternative audio by the television widget. Alternatively, if the user configured the television widget to obscure profanity, the audio from time2 through time3 may be replaced with more suitable alternative audio by the television widget, while the audio from time1 to time2 would not be modified by the television widget.

In some embodiments, a local storage device, such as storage 208 of FIG. 2, may store information pertaining to the composition of media content that may be used by a television widget to selectively obscure media content, for example, according to configuration setting set in content control configuration menu 300 of FIG. 3 and/or censor configuration menu 400 of FIG. 4. The data stored the local storage device may be in addition to, or alternative to, the data stored in databases 122. In some embodiments, the information pertaining to the composition of media content for use in obscuring media content may be user defined and/or configured. For example, the local storage device may store information for a particular media content that includes location information for where within the particular media content nudity, violence, and/or any other suitable type of content occurs, or any other suitable information as discussed above with regard to databases 122.

In some embodiments, the local storage device may store customized and/or customizable obscuring objects and/or sounds for use by the television widget. For example, the local storage device may store user created objects that may be used by the television widget to obscure objectionable visual content. As another example, the local storage device may store user created waveforms that may be used by the television widget to replace objectionable audio content. In some embodiments, the user created objects and/or waveforms may be downloaded from a third party provider to the local storage device. The objects and waveforms may be created using any suitable method. For example, the objects may be created using standard image editing software and the waveforms may be created using standard audio editing software. In some embodiments, the objects and/or waveforms are retrieved from the databases and/or storage devices at an appropriate time to utilize in obscuring media content.

In some embodiments, database configuration menu 500 may include local storage configuration 510 to configure communication information for the television widget to and from the local storage device. For example, configuration 510 may include information pertaining to the storage device's location, relevant data storage locations within the storage device (e.g., folders), data format information, type of data stored in the storage device, type of data to be retrieved and/or received from the storage device, and/or any other suitable information that may be used by the television widget to selectively obscure media content.

In some embodiments, a user and/or service provider may not want the television widget to access every available database when selectively obscuring content of media. For example, if a particular database is down for maintenance, or if the quality of the information in a known database does not meet the user's and/or service provider's standards. For example, a user and/or service provider may configure the television widget to use particular databases and/or storage devices by selecting checkboxes 512.

In some embodiments, a user and/or service provider may configure the television widget to give preference to a particular database(s) over another database(s) using database order preference configuration 514. For example, the internet database may be known to have more accurate information, provide information more attuned to a user's tastes, and/or provide information more quickly than the other databases. As such, a user and/or service provider may configure the television widget to first query the internet database before the other databases. As another example, if similar information is received from multiple databases, the television widget may choose to utilize the internet database information before or instead of the information provided by the other databases.

In some embodiments, database configuration menu 500 includes user equipment information 516. In some embodiments, a user and/or service provider may input information regarding what entertainment devices are connected to the user's television, manufacture information, model information, software version information, firmware version information, and/or any other suitable information pertaining to the user's equipment. In some embodiments, the information included in user equipment information 516 is utilized to assist in synchronizing the content obscuring done by the television widget with media content provided on the user equipment. Such embodiments are discussed in greater detail below.

In some embodiments, default button 518, save button 520, cancel button 522, and/or information button 524 may be included in database configuration menu 500. Default button 518, save button 520, cancel button 522, and information button 524 may be substantially similar to default button 310, save button 312, cancel button 314, and information button 316 of FIG. 3, respectively.

In some embodiments, databases and/or storage devices, such as databases 122 of FIG. 1 and storage 208 of FIG. 2, store any suitable configuration information associated with the television widget and/or user equipment. For example, the selected configuration options and data from configuration menus 300, 400, and 500 from FIGS. 3, 4, and 5, respectively, may be stored as appropriate in databases 122 and/or storage 208.

In some embodiments, a television widget, such as widget 105 of FIG. 1, may proceed with obscuring media content based on an instruction script. In some embodiments, the instruction script is generated by the television widget based on, for example, the configuration information selected in configuration menus 300, 400, and 500 from FIGS. 3, 4, and 5, respectively. Additionally, or alternatively, the widget may generate the instruction script based on, for example, media content information received from service provider 102, outsider provider processor 113, and/or databases 122 of FIG. 1. In some embodiments, service provider 102, outsider provider processor 113, and/or databases 122 may generate the television widget instruction script and transmit the instruction script to the television widget in any suitable manner, so that the television widget may execute the instruction script. For example, databases 122 may include a server and/or application that are configured to search at least one of databases 122 for content information and/or user preference information and/or generate the instruction script. In some embodiments, the widget may modify portions of the instruction script received from the service provider 102, outsider provider processor 113, and/or databases 122. For example, the service provider 102, outsider provider processor 113, and/or databases 122 may generate the instruction script based on default television widget configuration options. Upon receipt of the instruction script, the widget may modify the instruction script based on locally defined widget configuration options. Herein, the term "instruction generating device" may refer to any suitable combination of devices and/or applications, such as television widgets, user equipment, service providers, outsider provider processors, and/or databases that may be capable of or assist in the generation of widget instruction scripts.

The instruction script generated for execution by the television widget may be of any suitable computer readable media, such as computer programming code and/or scripts. For example, the instructions may be a java-based script, python-based script, and/or any other suitable script that may be read by the television widget.

In some embodiments, instruction generating devices may utilize the television widget configuration information and information pertaining to the composition of media content to generate an instruction script that instructs the television widget to selectively obscure media content. The instruction script may be transmitted to the television widget in any suitable manner, for example, as part of media content transmissions from service provider 102 and/or OPP 113 across communications network 130 of FIG. 1. For example, the instruction script may be transmitted to the television widget as part of the stream of digital data in a digital video feed. For example, the instructions may be transmitted as part of the user-defined data in an MPEG2 video. In some embodiments, the instructions may be transmitted during the vertical blanking interval in an analog video feed. In some embodiments, the instructions may be transmitted to the television widget using standard network communication capabilities.

In some embodiments, the television widget may not have access to particular information about media content being provided by user equipment. For example, the television widget may not have knowledge regarding the type of media content being provided, when it began, and/or what portion of the media is being provided (e.g., what frame number of a movie is being provided). In some embodiments, the television widget may be limited to knowledge of which channel the user equipment is tuned. For example, the television widget may gain access to the tuning information from tuning circuitry included in control circuitry 204 of FIG. 2.

In embodiments where the television widget has limited access to information pertaining to the media content, additional information may be required when creating the obscuring instructions such that the obscuring executed by the widget is substantially synchronized with the content that is being displayed on the user equipment. For example, the instruction generating devices may be able to determine what type of media content is being accessed by user equipment based on information regarding which channel the user equipment is tuned. In addition, the instruction generating devices may query the service provider and/or other sources for programming information. The channel may be any suitable channel, for example, broadcast media channel and/or on-demand media channel. In some embodiments, the channel may refer to content accessed over a network and/or the Internet. In some embodiments, the television widget may have knowledge regarding what media content provider is being accessed over a network and/or the Internet. For example, the television widget may be capable of determining the network address and/or website that is being accessed to provide media content at the user equipment. In some embodiments, the instruction generating devices may be able to determine the originating location of the media content that is being accessed by the user equipment.

In some embodiments, the instruction generating devices may determine various delays that are created in the distribution and processing of media content. For example, traffic in a communications network, such as communications network 130 of FIG. 1 may create delays when transmitting media content from a service provider (e.g., service provider 102) to a user's equipment (e.g., user equipment 108). In some embodiments, the transmission lines of the communications network may create an intrinsic delay because of the properties of the transmission lines. For example, the geographic location of the user equipment may influence transmission line delays. In some embodiments, the network equipment on the communications network and/or the user equipment itself may introduce processing delays when processing media content received from a service provider.

In order to compensate for delays, instruction generating devices may determine and/or estimate the delay between when media content is transmitted from a service provider to when it is provided on the user equipment. In some embodiments, the instruction generating devices may additionally, or alternatively, determine and/or estimate the delay between when an instruction script is transmitted from the instruction generating devices to when the instruction script is received at the user equipment.

Communication delays (e.g., those caused by traffic, transmission lines, and/or geographic location) may be determined and/or estimated using any suitable method. For example, a delay caused by the user equipment's geographic location in relation to the service provider may be determined by triangulating the user equipment, determining the location based on a network address (e.g., an IP address), determine the location based on service provider information (e.g., cable subscription information), and/or any other suitable method. In some embodiments, traffic and/or transmission line delays may be determined by pinging the user equipment.

In some embodiments, the instruction generating device may determine the processing delays caused by the user equipment. For example, the instruction generating device may utilize the information provided by user equipment information 516 of FIG. 5. For example, the instruction generating device may have access to information regarding how much processing delay each device listed in user equipment information adds when processing different types of media content (e.g., there may be different delay when the user equipment processes audio media content versus audio/visual media content).

When the delay is determined, the instruction generating device may incorporate the delay into timing instructions included in the instruction script. For example, the instruction generating device may instruct the television widget to provide an obscuring object at time 00:56:37, even though the portion of the media content to be obscured is transmitted from the service provider at time 00:56:24. In some embodiments, the television widget and the instruction generating device may use clocks that synchronized with each other to mitigate synchronization issues.

In some embodiments, the determined delay may be incorrect and/or there may be uncertainty regarding the delay. In such embodiments, synchronization errors may be mitigated by adjusting the size and/or timing of obscuring objects and/or sounds. For example, an instruction script may instruct the television widget to overlay an obscuring object that is larger than the content meant to be obscured. Thus, the content meant to be obscured will not become visible even when the content moves within a frame of media content, for example, earlier than expected. As another example, alternative audio that obscures objectionable audio in media content may be played for a longer duration to ensure the objectionable audio is obscured even when the audio content meant to be obscured is provided earlier than expected.

In some embodiments, the television widget may be capable of obtaining more advanced information regarding media content being provided on the user equipment (e.g., beyond knowledge to which channel the user equipment is tuned). For example, the television widget may have access to information regarding the frame number being provided on a display, the time at which the media content began, and/or triggering mechanisms in the media content that indicate timing information of the media content. For example, a broadcaster can flag part of audio and/or video in unmodified media content that is considered to be obscene or indecent. The television widget can obscure these flagged portions of the unmodified media content according to the widget's configuration settings. In some embodiments, a television widget with access to the more advanced information may be capable of executing instruction script timing instructions based on, for example, the frame number of the media content, triggering mechanisms as described in "OpenCable™ Specifications ETV Enhanced TV Application Messaging Protocol 1.0 OC-SP-ETV-AM1.0-I04-070921" by CableLabs, which is hereby incorporated by reference herein in its entirety, and/or any other suitable timing information determined by the television widget.

In some embodiments, the process of obscuring content by the television widget may be based on audio and/or visual recognition within the media content. For example, the television widget and/or any other suitable device may be capable of determining whether a profane word exists in the audio of the media content before the user equipment provides the audio associated with the profane word. For example, the audio content may be analyzed for profanity and/or other types of potentially objectionable content using any suitable voice and/or audio recognition technique. As another example, the television widget and/or any other suitable device may be capable of determining whether nudity exists during a portion of the media content before the user equipment provides nudity. Visual content may be analyzed for nudity and/or other types of potentially objectionable content using any suitable biometric and/or visual recognition technique. The television widget may obscure the objectionable content once such objectionable content is determined to exist using the audio and/or visual recognition techniques.

In some embodiments, the instruction generating devices transmit the obscuring instructions to the television widget in real-time or substantially real-time. For example, the instructions may be transmitted just seconds or less before portions of the media content to be obscured are provided by the user equipment device. Alternatively, the obscuring instructions may be transmitted completely before accessing the media content and/or as the user equipment begins to access the media content.

FIG. 6 shows illustrative communications log 600 that includes illustrative communication records between a television widget, such as television widget 105 of FIG. 1, and an instruction generating device, such as one of databases 122 of FIG. 1, from the perspective of the widget. In some embodiments, communications log 600 of FIG. 6 may be created and/or maintained at the television widget, at any other suitable instruction generating device, any suitable user device, or any other suitable system device, or any other suitable device. Communications log 600 may store any suitable data regarding the communications between, for example, the television widget and an instruction generating device.

At log_entry1, a television widget, labeled TV_WIDGET1, notes its network address. This information may be used for future communications with an instruction generating device and/or later for debugging purposes. At log_entry2, TV_WIDGET1 initiates communication with the instruction generating device, DATABASE1, at network address 65.3.222.5. The information required to initiate the communication between TV_WIDGET1 and DATABASE1 may be configured using a configuration menu substantially similar to database configuration menu 500 of FIG. 5.

At log_entry3, TV_WIDGET1 transmits information regarding the user equipment on which TV_WIDGET1 is implemented and location information of the user equipment to DATABASE1. This information may be gathered from and/or edited at, for example, user equipment information 516 of FIG. 5. This information may be utilized by DATABASE1 to, for example, estimate transmission and processing delays associated with providing media content at the user equipment. Once DATABASE1 estimates the delay, DATABASE1 may report the estimated delay back to TV_WIDGET1, as noted by log_entry4. In some embodiments, TV_WIDGET1 may utilize the estimated delay information to synchronize the execution of instruction scripts with provided media content.

At log_entry5, TV_WIDGET1 transmits information regarding the channel to which the user equipment is currently tuned to DATABASE1. For example, TV_WIDGET1 transmits that the user equipment is currently tuned to broadcast channel 25. This tuning information may be utilized by DATABASE1 to determine what media content the user equipment is currently providing. For example, DATABASE1 may access programming guide databases to determine what media content is scheduled to be provided on channel 25 at the current time. Once DATABASE1 determines what media content is currently being accessed, DATABASE1 may transmit the media content title, description, type, and/or any other suitable information to TV_WIDGET1, as illustrated by log_entry6. In some embodiments, TV_WIDGET1 may communicate the media content information to another database for use in generating an instruction script. In some embodiments, DATABASE1 may also transmit information regarding potentially objectionable material in the currently accessed media content. In such embodiments, TV_WIDGET1 may generate an instruction script to obscure the objectionable material in the currently accessed media content.

In alternative embodiments, DATABASE1 generates the instruction script and provides it to TV_WIDGET1. To aid in DATABASE1's generation of a customized instruction script, TV_WIDGET1 transmits the current widget configuration to DATABASE1 as illustrated by log_entry7. The widget configuration may be configured using, for example, content control configuration menu 300 and censor configuration menu 400 of FIGS. 3 and 4, respectively.

At log_entry8, the instruction script generated by DATABASE1 is received at TV_WIDGET1 from DATABASE1. As illustrated in log_entry8, the instruction script may include timing instructions to overlay a censor object in a particular time frame (e.g., in 5 seconds). In some embodiments, this time is determined by DATABASE1 to synchronize the display of the censor object with the providing of objectionable content in the media content. As further illustrated by log_entry8, the instruction script also may include instructions regarding the object label, object type, color type, size, angle, location, life, trajectory, and rate of size change of the censor object. In this case, TV_WIDGET1 will overlay an opaque triangle, labeled object1, in 5 seconds over media content being provided by the user equipment, as instructed by the instruction script. The triangle will have a base size of 400 pixels and a height of 570 pixels and be displayed at a 33° orientation. The triangle will initially be centered at pixel (600, 600). The triangle will be overlaid over the media content for a total of 10 seconds and will move across the media content during those 10 seconds at a velocity of 20 pixels/second, with a trajectory angle of 157°. Additionally, the triangle will change its base size and height size during those 10 seconds at a rate of 6 pixels/second and 4 pixels/second, respectively.

In some embodiments, DATABASE1 may additionally provide an instruction script that instructs TV_WIDGET1 to display text in the object discussed above with regard to log_entry8. For example, as illustrated by log_entry9, DATABASE1 may send an instruction script that instructs TV_WIDGET1 to display FUN_FACT1 in object1 for 5.2 seconds. In some embodiments, the text information "FUN_FACT1" may be a reference label for text stored in a suitable database and/or storage device that TV_WIDGET1 should retrieve. In some embodiments, TV_WIDGET1 will display "FUN_FACT1" in object1.

FIG. 7 illustrates example display 700 of media content selectively obscured with obscuring objects created by a television widget in accordance with an embodiment. Media content portion 702 and media content portion 704 depict a possible method for obscuring nudity. For example, an obscuring object is situated over the male genital area in portion 702. In this example, the use of a triangle-shaped obscuring object allows the obscuring object to be form-fitted tightly over the objectionable portion of the image. In portion 704, small circle-shaped obscuring objects are also form-fitted over objectionable portions of the female anatomy. In some embodiments, these form-fitted obscuring objects may not be used for parental control reasons, but instead to make the male image in portion 702 and/or the female image in portion 704 more attractive to some viewers. For example, these form-fitted obscuring objects leave little to the imagination, which in some embodiments, may be desirable as it may increase the "peek-a-boo" factor to some viewers.

Media content portion 706 illustrates an example of obscuring drug use with an obscuring object that includes text. In this example, a bottle of wine is relabeled as "Grape Juice". This may, for example, trick young viewers into thinking that the characters in media content are drinking glasses of grape juice as opposed to wine, which some parents may not want to encourage. In some embodiments, a similar obscuring object may be utilized to provide additional information, for example, fun facts related to the media content and/or advertisements related to the media content.

Media content portion 708 illustrates an example of obscuring nudity with completely opaque or flesh toned obscuring objects. In some embodiments, the obscuring objects in media content portion 708 may be comprised of multiple colors and/or have different levels of opaqueness. For example, the obscuring object may be opaque in the middle of the object and increasing transparent radiating outward from the middle. As with the examples of media content portions 702 and 704, the opaque obscuring objects may increase the "peek-a-boo" factor to some viewers.

Media content portion 710 illustrates an example of obscuring profanity. The obscuring object in this example is an "X" that obscures the motions of the character's mouth when voicing profane language. In some embodiments, visually obscuring profanity may be synchronized with audibly obscuring profanity, as discussed above with regard to censor configuration menu 400 of FIG. 4.

Media content portion 712 illustrates a portion of media content that is completely blocked using an obscuring object.

Media content portion 714 illustrates an example of obscuring violence. Here, an obscuring object obscures the view of a gun. The obscuring object here is slightly larger than the gun underneath to ensure that the gun is obscured even if there are synchronization errors when the television widget displays the obscuring object to when media content portion 714 is displayed.

In some embodiments, the obscuring objects may be interactively varied. For example, if a user's content control configurations are initially set to obscure a type of content, the user may interactively widen a resulting obscuring object to completely block the type of content.

The type of obscuring objects used on different types of content may be configured as described above with regard to configuration menus 300, 400, and 500 of FIGS. 3, 4, and 5, respectively. The obscuring objects shown here are depicted for illustrative purposes and are not meant to be limiting. For example, any suitable obscuring object may be utilized to obscure any suitable type of content.

Figure 8:
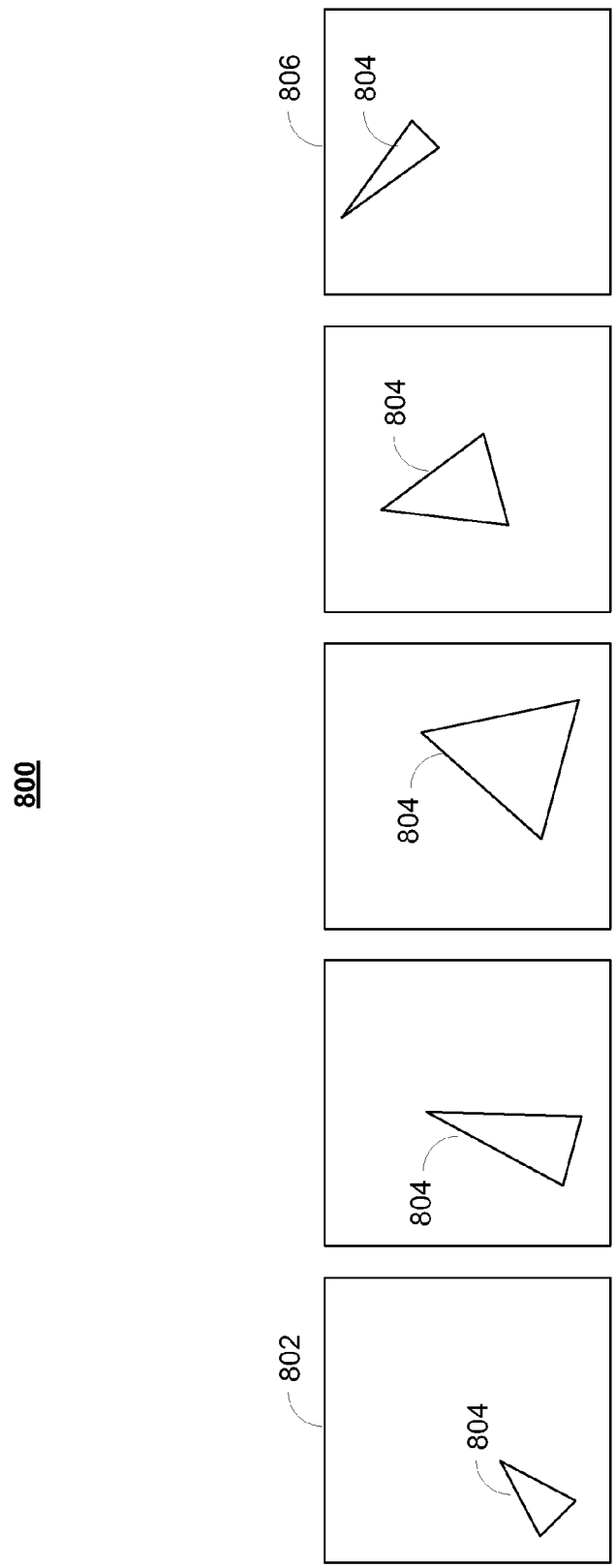
FIG. 8 shows an illustrative display of an obscuring object's movement through a media content selectively obscured using a television widget in accordance with an embodiment.

FIG. 8 shows illustrative display 800 of an obscuring object's movement through a media content selectively obscured using a television widget in accordance with an embodiment. For example, frame 802 may be provided at a first time with obscuring object 804. Obscuring object 804 may be provided by a television widget, such as television widget 105 of FIG. 1. Obscuring object 804 may be provided according to instructions provided by an instruction generating device, as discussed above with regard to FIG. 6. As discussed above with regard to FIG. 6, the obscuring object may change shape, orientation, placement within the media content, and/or any other suitable property to obscure objectionable content as the media content progresses. For example, as depicted in display 800, object 804 progresses through the frames of the media content until frame 806 at a second time, changing orientation, shape, and location as needed to continuously obscure a portion of the provided media content. As discussed above with regard to FIG. 6, in some embodiments, the properties of the obscuring objection may be defined by instructions based on location, trajectory, and/or timing, and/or any other suitable information stored in, for example, databases 122 of FIG. 1 and/or storage 208 of FIG. 2.

Figure 9:
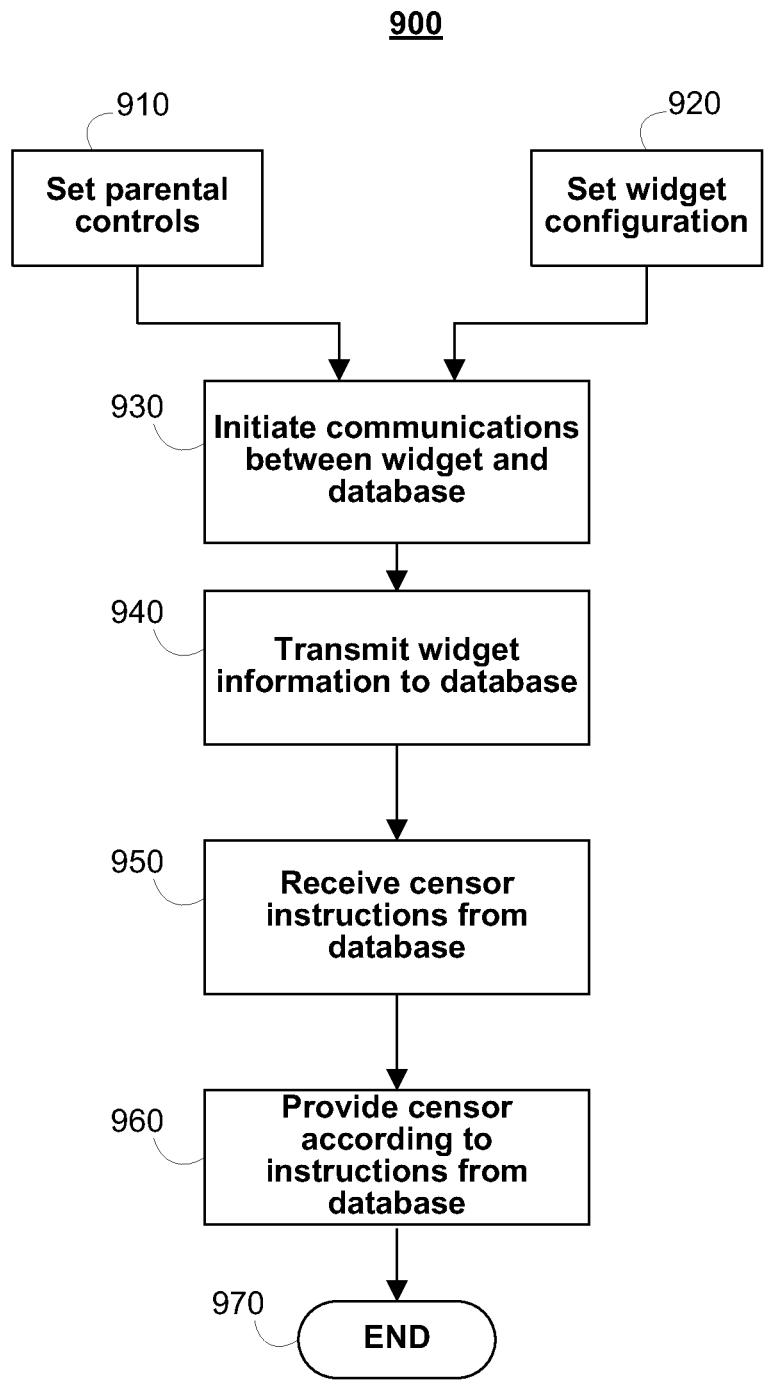
FIG. 9 is a flow chart of illustrative steps performed to provide a censor that selectively obscures media content in accordance with an embodiment.

FIG. 9 shows illustrative process 900 for providing a censor that selectively obscures media content using a television widget in accordance with an embodiment. In some embodiments, the steps of process 900 are performed by any suitable instruction generating device such as, television widgets, user equipment, service providers, outsider provider processors, and/or databases.

At step 910, parental controls are set. The parental controls may be set using, for example, content control configuration menu 300 and/or censor configuration menu 400 of FIGS. 3 and 4, respectively. At step 920, the widget configuration is set. The widget may be substantially similar to television widget 105 of FIG. 1. The widget configuration may be set using, for example, content control configuration menu 300, censor configuration menu 400, and/or database configuration menu 500 of FIGS. 3, 4, and 5, respectively. At step 930, communications are initiated between the widget and a database. The database may be, for example, one of databases 122 of FIG. 1 and/or storage 208 of FIG. 2. The communication between the widget and the database may take place in any suitable manner, as discussed above with regard to communications network 130 of FIG. 1.

At step 940, widget information is transmitted to the database. This information may include, for example, the parental controls set at step 910, the widget configuration set at step 920, and/or any other suitable information, as discussed above with regard to content control configuration menu 300, censor configuration menu 400, and/or database configuration menu 500 of FIGS. 3, 4, and 5, respectively.

At step 950, censor instructions are received from the database. The instructions may be substantially similar to the instruction script discussed above with regard to FIG. 6. The instructions may be provided in any suitable manner, as described above, for example, using communications network 130. At step 960, a censor is provided according to the instructions from the database. The censor may be substantially similar to the obscuring objects and/or alternative audio described above with regard to FIG. 4. At step 970, process 900 ends and, for example, the censor stops being provided by the widget (e.g., the widget stops overlaying a censor object on the media content and/or modifying the audio of the media content). In some embodiments, process 900 may restart when new censor instructions are received from the database. For example, process 900 may restart to step 950. In some embodiments, process 900 may restart when a user at the user equipment selects a different media content. For example, process 900 may restart to step 940 to transmit the new information to the database.

In practice, one or more stages shown in process 900 may be combined with other stages, performed in any suitable order, performed in parallel (e.g., simultaneously or substantially simultaneously), or removed. For example, initiating communications between the widget and the database at step 930 and transmitting of the widget information at step 940 may occur substantially simultaneously. It should be noted that a database is used for illustrative purposes in process 900, however, any suitable device capable of generating censor instructions may be utilized. Process 900 may be implemented using any suitable combination of hardware and/or software in any suitable fashion.

Figure 10:
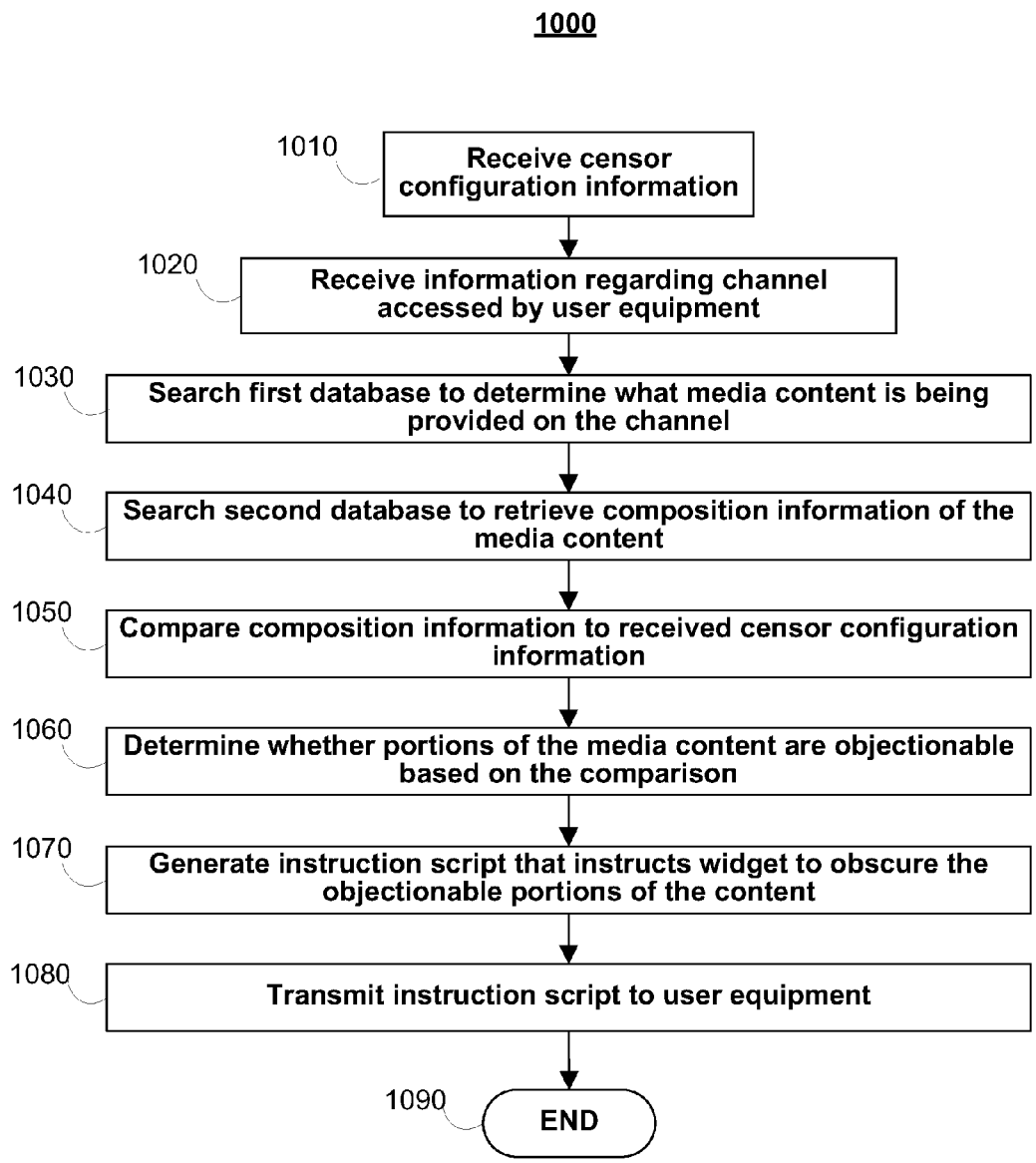
FIG. 10 is a flow chart of illustrative steps performed to generate an instruction script for execution by a widget in accordance with an embodiment.

FIG. 10 shows illustrative process 1000 for generating an instruction script for execution by a widget in accordance with an embodiment. In some embodiments, the steps of process 1000 are performed by any suitable instruction generating device such as television widgets, user equipment, service providers, outsider provider processors, and/or databases. At step 1010, censor configuration information is received. The information received at step 1010 may be substantially similar to the information set at steps 910 and 920 and/or information transmitted at step 940 of FIG. 9.

At step 1020, information regarding a channel accessed by a user equipment is received. In some embodiments, the user equipment is currently accessing the channel. In some embodiments, the user equipment will access the channel. For example, the user equipment may be scheduled to access the channel at a later time via a reminder and/or an instruction to record the channel at the later time. In some embodiments, the user equipment is substantially similar to user equipment 108 of FIG. 1.

At step 1030, a first database is searched to determine what media content is being provided on the channel (e.g., determining that channel 25 is providing a particular movie). The first database may be, for example, a database included with service provider 102 of FIG. 1 that stores media listings, broadcast times, broadcast channels, or any other suitable information.

At step 1040, a second database is searched to retrieve the composition of media content being provided by the particular channel. For example, the second database may be searched for information pertaining to where and when potentially objectionable content occurs within the media content. This may include information pertaining to where and when within the media content nudity, violence, and/or any other suitable type of content occurs as described above with regard to databases 122. In some embodiments, the second database is the first database.

At step 1050, the composition information retrieved at step 1040 is compared with the censor configuration information received at step 1010. At step 1060, it is determined whether portions of the media content are objectionable based on the comparison made at step 1050. For example, a portion of the media content could be determined to be objectionable if it contains violence and the censor configuration information indicates that violence is objectionable.

At step 1070, an instruction script is generated. The instruction script includes instructions for a widget to obscure the portions of the content determined to be objectionable at step 1060. At step 1080, the instruction script generated at step 1070 is transmitted to the user equipment using, for example, communications network 130 of FIG. 1.

At step 1090, process 1000 ends and steps of process 1000 cease. In some embodiments, process 1000 may restart when, for example, new channel information is received.

In practice, one or more stages shown in process 1000 may be combined with other stages, performed in any suitable order, performed in parallel (e.g., simultaneously or substantially simultaneously), or removed. For example, the comparison between the composition information and the configuration information at step 1050 may occur substantially simultaneously with the determination whether portions of the media content are objectionable. Process 1000 may be implemented using any suitable combination of hardware and/or software in any suitable fashion.

Figure 11:
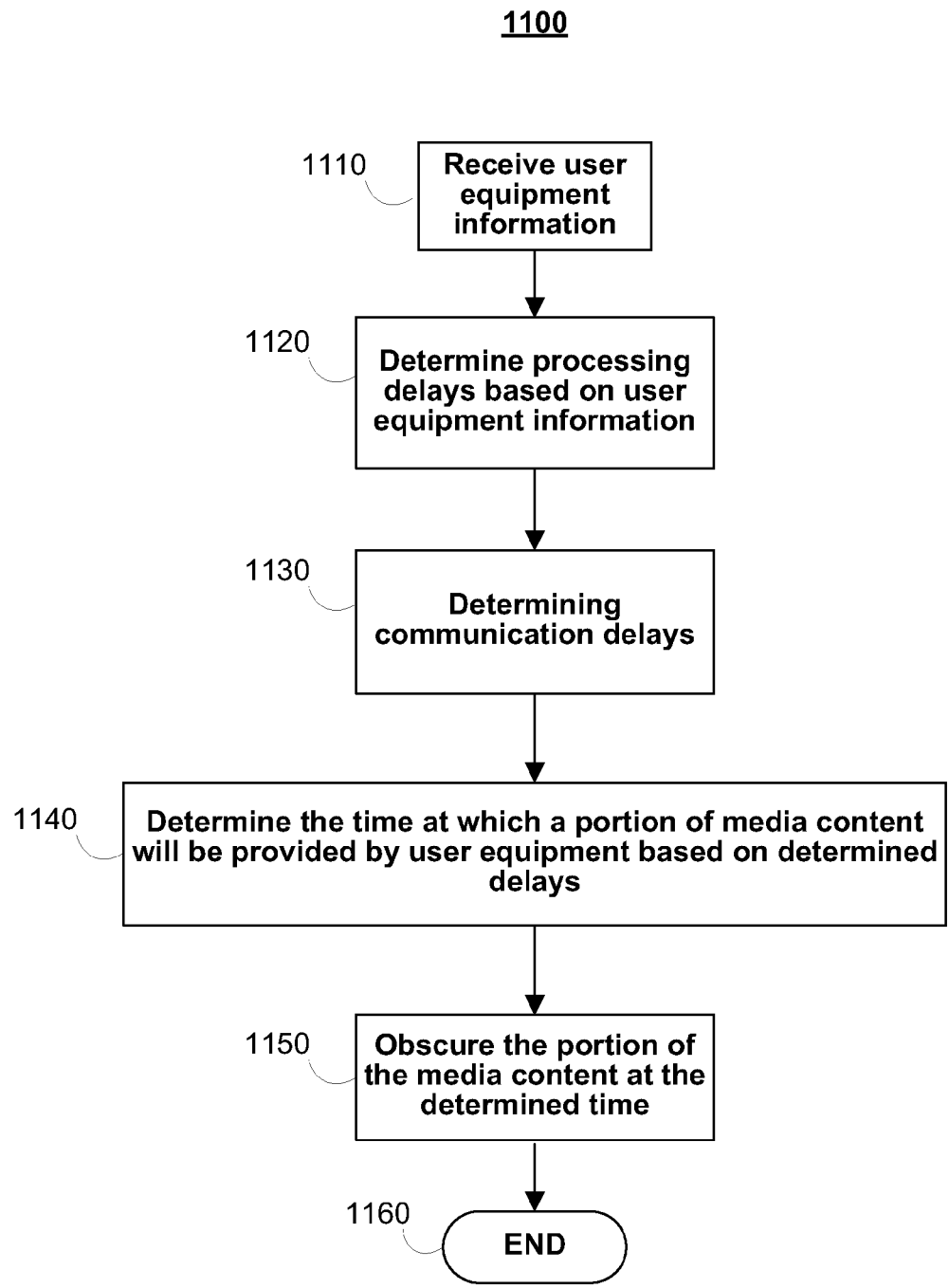
FIG. 11 is a flow chart of illustrative steps performed to synchronize obscuring operations with media content provided on user equipment in accordance with an embodiment.

FIG. 11 shows illustrative process 1100 for synchronizing obscuring operations performed by a widget with media content provided on user equipment in accordance with an embodiment. In some embodiments, the steps of process 1100 are performed by any suitable instruction generating device such as, television widgets, user equipment, service providers, outsider provider processors, and/or databases.

At step 1110, user equipment information is received. In some embodiments, the user equipment may be substantially similar to user equipment 108 of FIG. 1. The information received at step 1110 may be substantially similar to the information set at step 920 and/or information transmitted at step 940 of FIG. 9.

At step 1120, processing delays are determined based on the user equipment information received at step 1110. For example, an instruction generating device may have access to information regarding how much processing delay each device included in the user equipment adds when processing different types of media content (e.g., there may be different delay when the user equipment processes audio media content versus audio/visual media content). The instruction generating device may then add each device processing delay as appropriate to arrive at a total processing delay determination for the user equipment.

At step 1130, communication delays are determined. Communication delays (e.g., those caused by traffic, transmission lines, and/or geographic location) may be determined and/or estimated using any suitable method. For example, a delay caused by the user equipment's geographic location in relation to a service provider, such as service provider 102, may be determined by triangulating the user equipment, determining the location based on a network address (e.g., an IP address), determining the location based on service provider information (e.g., cable subscription information), and/or any other suitable method. Traffic and/or transmission line delays may be determined by, for example, pinging the user equipment.

At step 1140, the time at which a portion of media content will be provided by user equipment is determined based on the delays determined at steps 1120 and 1130. For example, it may be known that a particular media content is being accessed by the user equipment and that portions of the media content are transmitted from the service provider at particular times. Using the determined delay information, it can be determined when the portions of the media content would be provided by the user equipment (e.g., displayed on the user equipment). This may be done by, for example, adding the processing and communication delays to the time at which the portion is transmitted from the service provider.

At step 1150, the portion of the media content is obscured at the determined time. For example, the media content may be obscured using any suitable obscuring object and/or alternative audio as described above with regard to FIG. 4. As another example, the obscuring may be executed by a widget based on an instruction script that includes the timing information, as discussed above with regard to FIG. 6. In this manner, the obscuring operation may be synchronized with when the portion of the media content is provided by the user equipment.

In practice, one or more stages shown in process 1100 may be combined with other stages, performed in any suitable order, performed in parallel (e.g., simultaneously or substantially simultaneously), or removed. For example, the determination of the processing delays at step 1120 and the determination of the communication delays at step 1130 may occur substantially simultaneously. Process 1100 may be implemented using any suitable combination of hardware and/or software in any suitable fashion.

It is to be understood that while certain forms of the present invention have been illustrated and described herein, it is not to be limited to the specific forms or arrangement of parts described and shown. Those skilled in the art will know or be able to ascertain using no more than routine experimentation, many equivalents to the embodiments and practices described herein. Accordingly, it will be understood that the invention is not to be limited to the embodiments disclosed herein.

What is claimed is:

1. A method for selectively obscuring portions of media content that is transmitted user equipment using a television widget, the method comprising:
   configuring, using processing circuitry, the television widget with user-specific obscuring configuration options;
   receiving, using the processing circuitry, information associated with portions of the media content to selectively obscure; and
   obscuring, using the television widget, the portions of the frame of the media content based on the received information, wherein the received information comprises:
   instructions for modifying the portion of the frame of the media content, and
   timing information for the modifying such that the modifying occurs at the same time as the portion of the frame of the media content is caused to be displayed on the user equipment, wherein the timing information accounts for delays associated with the transmission of the media content to the user equipment.

2. The method of claim 1, wherein the modifying uses at least one of a visible object and a sound replacement.

3. The method of claim 2, wherein the modifying comprises:
   causing to be displayed the visible object over the portions of the frame of the media content in accordance with the instructions for modifying.

4. The method of claim 3, wherein the modifying uses at least one of: shape of the visible object, when to display the visible object, where to display the visible object within a display, size of the visible object, orientation of the visible object, color properties of the visible object, and trajectory of the visible object across multiple frames of the media content.

5. The method of claim 2, wherein the instructions for modifying the portion of the frame of the media content comprise:
   instructions for replacing a portion of original audio of the media content with the sound replacement.

6. The method of claim 5, wherein the modifying uses at least one of: type of the sound replacement to use, length of the sound replacement, and a waveform associated with the sound replacement.

7. The method of claim 2, wherein the timing information includes instructions for a time at which the modifying should occur.

8. The method of claim 7, wherein the timing information for the modifying includes at least one of processing delays and communication delays.

9. The method of claim 1, wherein duration of the obscuring is lengthened to ensure that the obscuring occurs at the same time as the portions of the frame of the media content is caused to be displayed on the user equipment.

10. The method of claim 2, wherein dimensions of the visible object are enlarged to ensure that the portions of the frame media content is obscured when there are errors in the timing information.

11. The method of claim 1, wherein the configuration options include configuration of types of content to obscure.

12. The method of claim 2, wherein the configuration options include configuration of properties of the visible object or the sound replacement.

13. The method of claim 1, wherein the information associated with the portion of the frame of the media content to selectively obscure is received while the media content is transmitted to the user equipment.

14. The method of claim 1, wherein the information associated with the portion of the frame of the media content to selectively obscure is received prior to the transmission of the media content to the user equipment.

15. The method of claim 1, wherein the information associated with the portion of the frame of the media content to selectively obscure is received as part of the media content.

16. A method for selectively obscuring a portion of media content that is transmitted to user equipment using a television widget, the method comprising:
   receiving, using processing circuitry, user equipment information;
   determining, using the processing circuitry, delays associated with transmitting the media content to the user equipment;
   determining, using the processing circuitry, a time at which the portion of the media content will be caused to be displayed on the user equipment, wherein the time is determined based on the determined delays; and
   obscuring, using the processing circuitry, the portion of the media content at the determined time.

17. The method of claim 16, wherein the determined delays include at least one of processing delays and communication delays.

18. The method of claim 16, wherein the obscuring is executed processing circuitry of the user equipment.

19. The method of claim 18, wherein the obscuring is based on instructions that are transmitted in an instruction script.

20. The method of claim 16, wherein the portion of the media content is determined to be objectionable.

21. A system for selectively obscuring portions of media content that is transmitted to user equipment using a television widget, the system comprising:
processing circuitry configured to:
allow a user to configure the television widget with user-specific obscuring configuration options;
receive information associated with portions of a frame of the media content to selectively obscure; and
obscure, using the television widget, the portions of the media content based on the received information, wherein the received information comprises:
instructions for modifying the portion of the frame of the media content, and
timing information for the modifying such that the modifying occurs at the same time as the portions of the frame of the media content is caused to be displayed on the user equipment, wherein the timing information accounts for delays associated with the transmission of the media content to the user equipment.

22. The system of claim 21, wherein the modifying uses at least one of a visible object and a sound replacement.

23. The system of claim 22, wherein the modifying comprises:
causing to be displayed the visible object over the portions of the frame of the media content in accordance with the instructions for obscuring.

24. The system of claim 23, wherein the modifying uses at least one of: shape of the visible object, when to display the visible object, where to display the visible object within a display, size of the visible object, orientation of the visible object, color properties of the visible object, and trajectory of the visible object across multiple frames of the media content.

25. The system of claim 22, wherein the instructions for modifying the portion of the frame comprise:
instructions for replacing a portion of original audio of the media content with the sound replacement.

26. The system of claim 25, wherein the modifying uses at least one of: type of the sound replacement to use, length of the sound replacement, and a waveform associated with the sound replacement.

27. The system of claim 22, wherein the timing information includes instructions for a time at which the modifying should occur.

28. The system of claim 27, wherein the timing information for the modifying at least one of processing delays and communication delays.

29. The system of claim 21, wherein duration of the obscuring is lengthened to ensure that the obscuring occurs at the same time as the portions of the frame of the media content is caused to be displayed on the user equipment.

30. The system of claim 22, wherein dimensions of the visible object are enlarged to ensure that the portion of the frame of the media content is obscured when there are errors in the timing information.

31. The system of claim 21, wherein the configuration options include configuration of types of content to obscure.

32. The system of claim 22, wherein the configuration options include configuration of properties of the visible object or the sound replacement.

33. The system of claim 21, wherein the information associated with the portion of the frame of the media content to selectively obscure is received while the media content is transmitted to the user equipment.

34. The system of claim 21, wherein the information associated with the portion of the frame of the media content to selectively obscure is received prior to the transmission of the media content to the user equipment.

35. The system of claim 21, wherein the information associated with the portion of the frame of the media content to selectively obscure is received as part of the media content.

36. A system for selectively obscuring a portion of media content that is provided on user equipment using a television widget, the system comprising:
a server configured to:
receive user equipment information;
determine delays associated with transmitting the media content to the user equipment;
determine a time at which the portion of the media content will be caused to be displayed on the user equipment, wherein the time is determined based on the determined delays; and
transmit instructions to the user equipment to obscure the portion of the media content at the determined time.

37. The system of claim 36, wherein the determined delays include at least one of processing delays and communication delays.

38. The system of claim 36, wherein processing circuitry of the user equipment executes the transmitted instructions to obscure the portion of the media content at the determined time.

39. The system of claim 38, wherein the instructions are transmitted in an instruction script.

40. The system of claim 36, wherein the portion of the media content is determined to be objectionable.

41. A non-transitory machine-readable medium comprising instructions thereon for selectively obscuring portions of media content that is transmitted to user equipment using a television widget, the instructions comprising:
instructions to allow a user to configure the television widget with user-specific obscuring configuration options;
instructions to receive information associated with a portion of a frame of the media content to selectively obscure; and
instructions to obscure, using the television widget, the portion of the frame of the media content based on the received information, wherein the received information comprises:
instructions for modifying the portion of the frame of the media content, and
timing information for the modifying such that the modifying occurs at the same time as the portion of the frame of the media content is caused to be displayed on the user equipment, wherein the timing information accounts for delays associated with the transmission of the media content to the user equipment.

42. The non-transitory machine-readable medium of claim 41, wherein the modifying uses at least one of a visible object and a sound replacement.

43. The non-transitory machine-readable medium of claim 42, wherein the modifying comprises:
causing to be displayed the visible object over the portion of the frame of the media content in accordance with the instructions for modifying.

44. The non-transitory machine-readable medium of claim 43, wherein the modifying uses at least one of: shape of the visible object, when to display the visible object, where to display the visible object within a display, size of the visible object, orientation of the visible object, color properties of the visible object, and trajectory of the visible object across multiple frames of the media content.

45. The non-transitory machine-readable medium of claim 42, wherein the modifying the portion of the frame of the media content comprises:
replacing a portion of original audio of the media content with the sound replacement.

46. The non-transitory machine-readable medium of claim 45, wherein the modifying uses at least one of: type of the sound replacement to use, length of the sound replacement, and a waveform associated with the sound replacement.

47. The non-transitory machine-readable medium of claim 41, wherein the timing information includes instructions for a time at which the modifying should occur.

48. The non-transitory machine-readable medium of claim 47, wherein the timing information for the modifying includes at least one of processing delays and communication delays.

49. The non-transitory machine-readable medium of claim 41, wherein duration of the obscuring is lengthened to ensure that the obscuring occurs at the same time as the portion of the frame of the media content is caused to be displayed on the user equipment.

50. The non-transitory machine-readable medium of claim 42, wherein dimensions of the visible object are enlarged to ensure that the portion of the frame of the media content is obscured when there are errors in the timing information.

51. The non-transitory machine-readable medium of claim 41, wherein the configuration options include configuration of types of content to obscure.

52. The non-transitory machine-readable medium of claim 42, wherein the configuration options include configuration of properties of the visible object or the sound replacement.

53. The non-transitory machine-readable medium of claim 41, wherein the information associated with the portion of the frame of the media content to selectively obscure is received while the media content is transmitted to the user equipment.

54. The non-transitory machine-readable medium of claim 41, wherein the information associated with the portion of the frame of the media content to selectively obscure is received prior to the transmission of the media content to the user equipment.

55. The non-transitory machine-readable medium of claim 41, wherein the information associated with the portion of the frame of the media content to selectively obscure is received as part of the media content.

56. A non-transitory machine-readable medium comprising instructions thereon for selectively obscuring portions of media content that is transmitted to user equipment using a television widget, the instructions comprising:
instructions to receive user equipment information;
instructions to determine delays associated with transmitting the media content to the user equipment;
instructions to determine a time at which the portion of the media content will be caused to be displayed on the user equipment, wherein the time is determined based on the determined delays; and
instructions to obscure the portion of the media content at the determined time.

57. The non-transitory machine-readable medium of claim 56, wherein the determined delays include at least one of processing delays and communication delays.

58. The non-transitory machine-readable medium of claim 56, wherein the instructions to obscure are executed by processing circuitry of the user equipment.

59. The non-transitory machine-readable medium of claim 58, wherein the obscuring is based on instructions transmitted in an instruction script from a server.

60. The non-transitory machine-readable medium of claim 56, wherein the portion of the media content is determined to be objectionable.

* * * * *

UNITED STATES PATENT AND TRADEMARK OFFICE
CERTIFICATE OF CORRECTION

| | | |
|---|---|---|
| PATENT NO. | : 8,893,169 B2 | Page 1 of 1 |
| APPLICATION NO. | : 12/649910 | |
| DATED | : November 18, 2014 | |
| INVENTOR(S) | : Klappert et al. | |

It is certified that error appears in the above-identified patent and that said Letters Patent is hereby corrected as shown below:

IN THE CLAIMS:

Column 26

Claim 7, line 21, change "claim 2" to -- claim 1 --

Column 27

Claim 27, line 49, change "claim 22" to -- claim 21 --

Signed and Sealed this
Twenty-fourth Day of February, 2015

Michelle K. Lee
*Deputy Director of the United States Patent and Trademark Office*